United States Patent [19]
McMullen et al.

[11] Patent Number: 6,039,774
[45] Date of Patent: Mar. 21, 2000

[54] PYROLYTIC CONVERSION OF ORGANIC FEEDSTOCK AND WASTE

[76] Inventors: Frederick G. McMullen, P.O. Box 396, Gwynedd Valley, Pa. 19437; Dillon G. McMullen, N6640 County Hwy. H; Roger B. McMullen, N5238 Hwy. 51, both of Irma, Wis. 54442

[21] Appl. No.: 08/774,185

[22] Filed: Dec. 26, 1996

Related U.S. Application Data

[62] Division of application No. 08/255,326, Jun. 7, 1994, Pat. No. 5,589,599.

[51] Int. Cl.⁷ .................................. C10G 9/04; B01F 3/02
[52] U.S. Cl. ............................. 48/102 A; 48/105; 48/108; 48/90; 48/187; 48/189.2; 202/84; 202/99; 202/100; 202/106
[58] Field of Search .................... 48/108, 102 A, 48/105, 90, 187, 189.2; 202/84, 99, 100, 106

[56] References Cited

U.S. PATENT DOCUMENTS

| | | | |
|---|---|---|---|
| 3,020,212 | 2/1962 | Lantz | 202/118 |
| 3,769,921 | 11/1973 | McMullen | 110/8 R |
| 3,853,498 | 12/1974 | Baile | 48/209 |
| 4,002,438 | 1/1977 | Fleming | 48/76 |
| 4,077,847 | 3/1978 | Choi et al. | 201/21 |
| 4,145,274 | 3/1979 | Green | 208/8 |
| 4,153,514 | 5/1979 | Garrett | 201/2.5 |
| 4,162,959 | 7/1979 | Duraiswamy | 208/8 R |
| 4,166,786 | 9/1979 | Duraiswamy | 208/8 R |
| 4,172,431 | 10/1979 | Tatem | 122/5 |
| 4,260,473 | 4/1981 | Bauer | 208/14 |
| 4,321,150 | 3/1982 | McMullen | 210/769 |
| 4,321,151 | 3/1982 | McMullen | 210/769 |
| 4,356,077 | 10/1982 | Che | 208/8 R |
| 4,357,228 | 11/1982 | Che | 208/8 R |
| 4,375,402 | 3/1983 | Duraiswamy | 208/8 R |
| 4,439,209 | 3/1984 | Wilwerding | 48/76 |
| 4,578,175 | 3/1986 | Gorin | 208/8 R |
| 4,705,603 | 11/1987 | McMullen | 202/109 |
| 4,759,300 | 7/1988 | Hansen | 110/229 |
| 4,968,407 | 11/1990 | McGrath et al. | 208/131 |
| 4,994,169 | 2/1991 | Godino et al. | 208/50 |
| 5,240,565 | 8/1993 | Williams | 202/99 |
| 5,245,762 | 9/1993 | Hartis | 34/15 |
| 5,460,699 | 10/1995 | Bilan et al. | 201/25 |

FOREIGN PATENT DOCUMENTS

| | | | |
|---|---|---|---|
| 324668A1 | 7/1989 | European Pat. Off. | C10B 53/00 |
| 436379A1 | 1/1992 | European Pat. Off. | C10B 53/00 |
| 2423891A1 | 12/1975 | Germany | C10B 53/00 |
| 90/11475 | 10/1990 | WIPO | F23G 5/20 |

*Primary Examiner*—Nina Bhat
*Attorney, Agent, or Firm*—Leigh P. Gregory

[57] ABSTRACT

A self-sustaining system for converting organic waste feedstreams into usable solid and gas end products includes a plurality of interconnected retorts, an apparatus for flash pyrolyzing the feedstream to form intermediate gas and solid products, a source for introducing a water spray to refine and cool the intermediate products, a device for separating the gas product from the solid product and a device for regenerating, and thereby further refining, the solid product. In a self-sustaining process, wastes which would otherwise be landfilled are converted to an activated carbon product and a combustible gas mixture of hydrogen, carbon monoxide, and lower hydrocarbons.

12 Claims, 12 Drawing Sheets

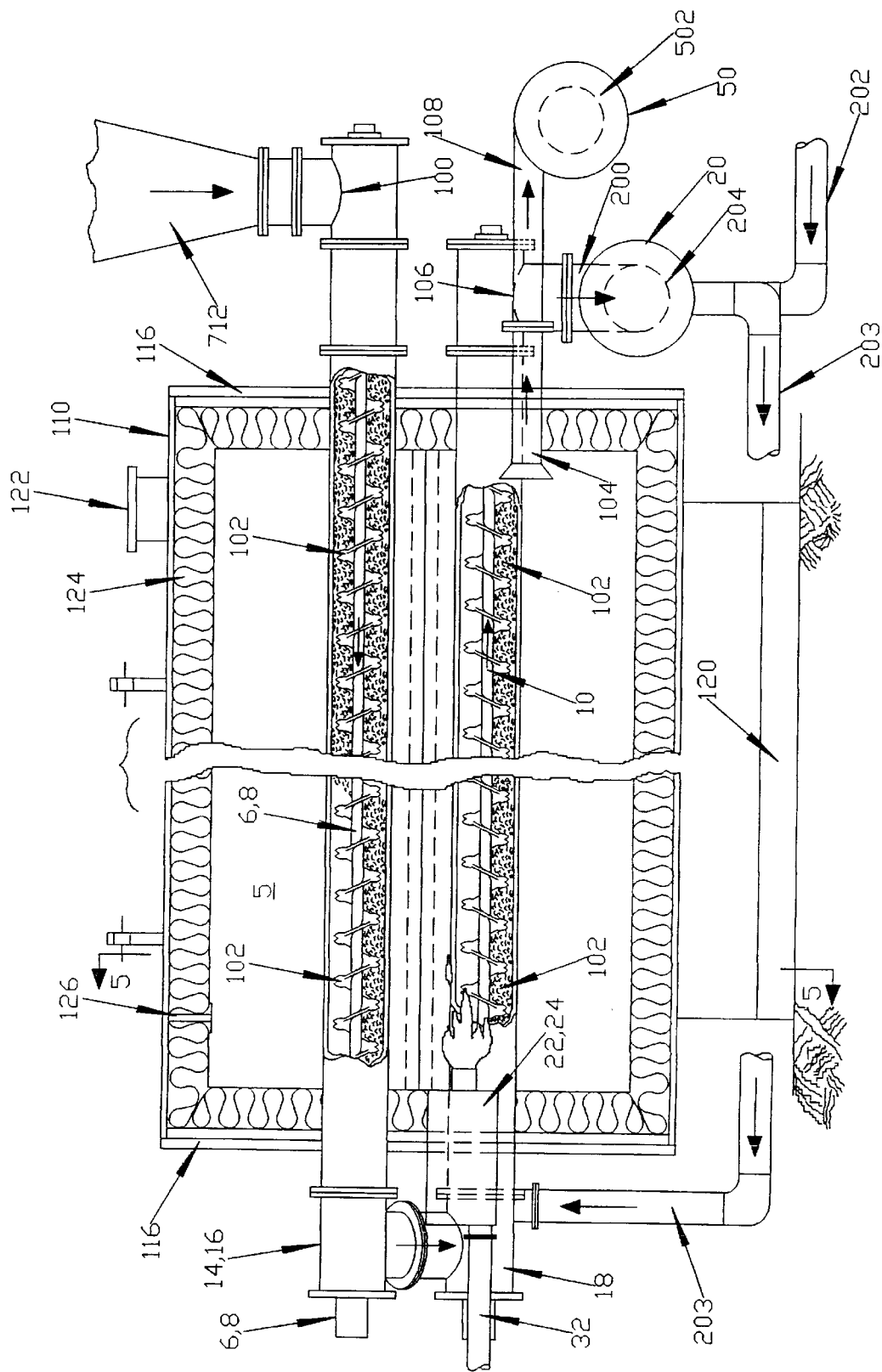

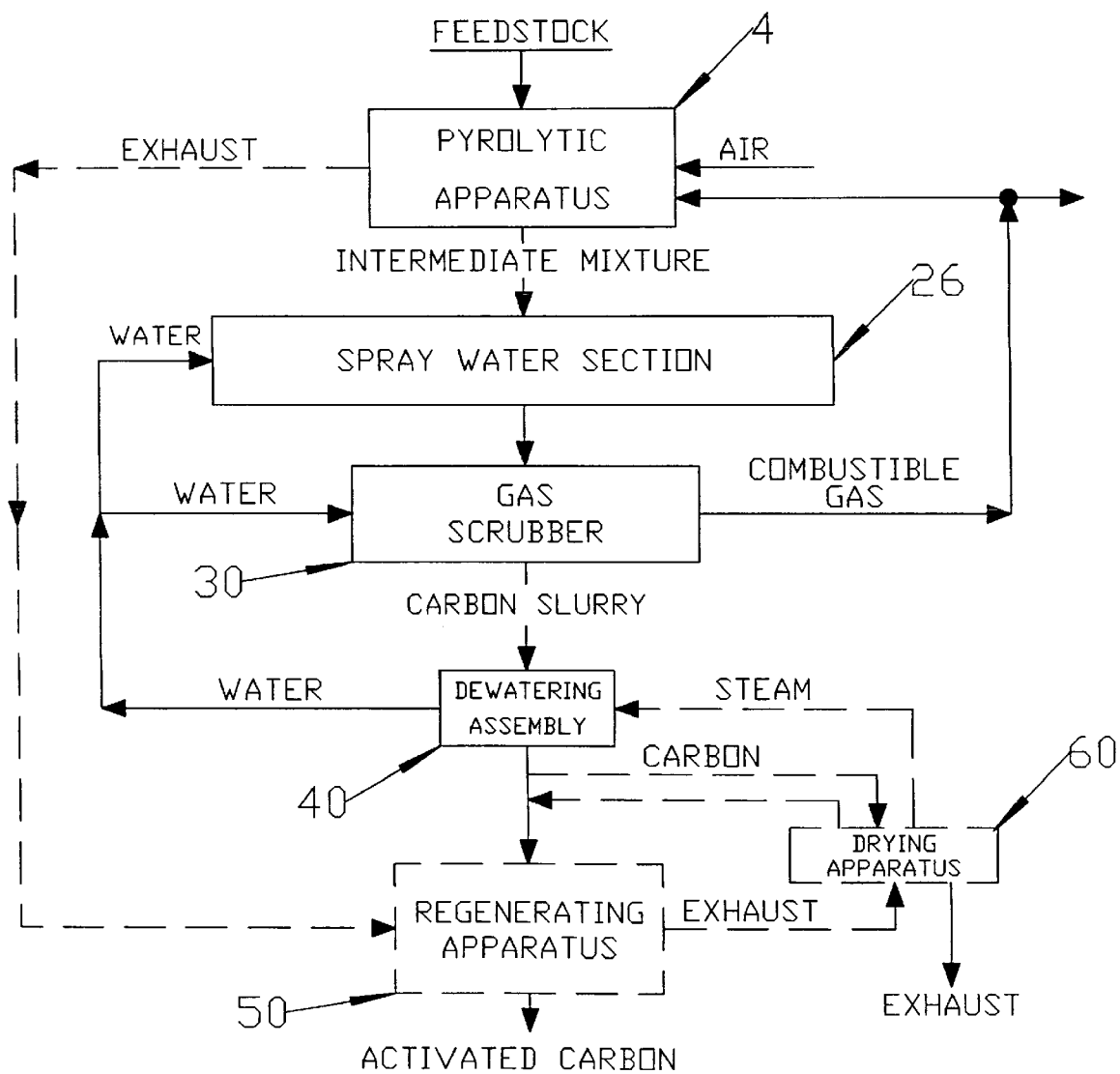

PYROLYTIC CONVERSION OF ORGANIC FEEDSTOCK AND WASTE

This is a divisional of 08/255,326, filed Jun. 7, 1994 now U.S. Pat. No. 5,589,599.

BACKGROUND OF THE INVENTION

The present invention is directed to a pyrolytic system for the conversion of organic feedstreams, such as waste feedstreams, into usable, valuable end products. Specifically, the present invention is directed to a self-sustaining pyrolytic apparatus and process for converting waste materials into a beneficial, activated carbon and a combustible gas products.

Organic materials in the form of fossil fuels such as coal and crude oil or renewable resources such as forests and food materials have previously been manufactured directly and indirectly into products and by-products eventually treated as waste. Such waste has been and continues to be in dry, moist and wet forms emanating from industrial, mining, agricultural and municipal sources such as liquid and solid municipal wastes. All various man-made waste materials continue to be emitted worldwide to land, air and waterways causing recognized pollutants such as classified "greenhouse" gases, dioxins and toxic compounds of metals. All of these are subject to environmental scrutiny and regulatory emissions control. Such deleterious emissions are the result of mistreatment as waste when the same materials can be useful as feedstock for the systems to be disclosed and claimed herein as the invention.

While partial pyrolysis (incomplete combustion) techniques have been practiced in the past, there are no known commercial systems of ongoing pure pyrolysis operations. Separation is a process step whereby after the mixture of substances and the chemical compounds comprising the composition of a feedstock are transformed into different chemical compositions and phases being intermediate products and are divided into separate containment. Because such separation resists forces and the conversion of heat to work is limited by the temperature at which conversion occurs, it is a costly step with partial pyrolysis in terms of the energy to make separation occur. Other techniques such as pressure and cryogenics are also not preferred for separation of mixed components within the process stream. Pressure swing adsorption, molecular sieves, activated alumina and zeolites may be used for separation but these are also limited and not preferred for many applications.

Conventional plants use the combustion of materials to generate steam from water in a boiler. The process by which such steam drives a steam turbine to generate electrical power and is thereafter returned to water is known as the Rankine cycle. Such plants are complex in design and require substantial investments in large equipment and real estate. Furthermore such systems emit polluting exhausts and create large quantities of ash which must be landfilled. As an alternative, a variety of pyrolytic processes, some of which may be employed in the disposal of waste feedstocks, have been proposed.

U.S. Pat. No. 4,145,274, is directed to a continuous process for recovering product gas and carbon char from an organic feedstream which includes a flash pyrolysis zone as well as means for preparing the initial carbonaceous material for pyrolysis, product recovery means and a gas cleanup operation. However, the process requires that the carbonaceous material is comminuted to a particle size of less than about 1000 microns in diameter and transported to the pyrolysis zone in a carrier gas which has a solids content of no more than about 10% by volume. A particulate source of heat may be derived from the oxidation product of recovered solids.

U.S. Pat. No. 4,153,514 is directed to a pyrolysis process for solid wastes which is similar to that of the '274 patent, discussed above, but which requires that waste solids comminuted to a particle size of no more than one inch are mixed with hot particulate carbon char in the carrier gas prior to entering the pyrolysis zone.

U.S. Pat. No. 4,162,959 is directed a pyrolysis process wherein simultaneous pyrolysis and hydrogenation reactions occur within a pyrolysis zone. Comminuted carbonaceous material contained within a carrier gas is fed into a pyrolysis zone along with hydrogen recovered from a conversion zone. Hydrogen and other gases are formed in the conversion zone wherein hot char particles obtained from the pyrolysis zone are reacted with steam. Steam is also injected into the pyrolysis zone to react with the hot particulate char contained there to generate additional hydrogen gas to further hydrogenate the volatized hydrocarbons resulting from the pyrolysis of the carbonaceous material.

U.S. Pat. No. 4,166,786, is directed to a process which is similar in many aspects to that of the '959 patent discussed above. However, rather than introducing steam into the pyrolysis zone as disclosed in the '959 patent, a vapor mixture which includes volatilized hydrocarbons and unreacted hydrogen gas which is recovered from the pyrolysis zone is separated from the carbon containing residue and hydrogenated in the presence of a catalyst in a vapor hydrogenation zone.

U.S. Pat. No. 4,260,473 is directed to a pyrolysis process for solid organic wastes which requires separation of solid product of pyrolysis from pyrolysis vapor which contains entrained particulate matter, condensing at least a portion of the pyrolysis vapor, centrifuging the resultant liquid and separating it into different fractions.

U.S. Pat. No. 4,356,077 is directed to a pyrolysis process similar to that disclosed in the '274 patent, discussed above. However, rather than in an inert carrier gas, the comminuted carbonaceous material is transported into the pyrolysis zone in a "beneficially reactive gas." Such is defined as a gas which is substantially free of free oxygen and which contains gaseous constituents which inhibit the reactivity of the char product and the carbon containing particulate solid source of heat. Following pyrolysis the pyrolytic vapors are quenched and separated by vacuum flashing prior to further separation and enrichmert steps.

U.S. Pat. No. 4,357,228 is similar to the '077 patent, discussed above, in that it is directed primarily to post-pyrolysis processing of pyrolysis vapors quenching and vacuum flashing steps.

U.S. Pat. No. 4,375,402 is directed to a pyrolysis process similar to that disclosed in the '274 patent, discussed above. However, following pyrolysis particulate solids are separated from the gas product which is, in turn, is immediately contacted with a quench fluid which contains at least one capping agent which stabilizes the newly formed volatilized hydrocarbon free radicals contained in the gaseous mixture and condenses most of the larger hydrocarbons.

U.S. Pat. No. 3,853,498 is directed to a process for the gasification of waste which includes an endothermic pyrolysis zone which is a bed of fluidized, inert particulate solids and an exothermic combustion zone which is also a bed of inert particulate solids with the heat for pyrolysis being transferred from the combustion zone by circulating the inert particulate solids between the two zones.

U.S. Pat. No. 4,002,438 is directed to a pyrolytic apparatus having a pyrolysis reaction chamber and a combustion chamber. Recycled product carrier gas and a dense, hard, abrasion resistant material, such as sand, are circulated through the apparatus to transfer heat from the combustion chamber to the pyrolysis chamber.

U.S. Pat. No. 4,578,175 is directed to a combined process for coal pyrolysis and char gasification. Finely divided coal is mixed with a hydrogen-containing recycle gas stream and is introduced into the lower region of a vertical pyrolysis zone along with finely divided heated char. The resulting mixture passes upwardly through the pyrolysis zone at a temperature between 500 and 950° C. and a pressure between about 3 and about 33 atmospheres. Gas, liquid and solid product streams are removed from an upper region of the pyrolysis zone. Thereafter, product solids are introduced into the lower region of a vertically elongated fluidized bed gasification zone for treatment with an oxygen containing gas.

U.S. Pat. No. 5,245,762 is directed to an apparatus and method for drying sludge wherein batches of sludge are received by a loading device and then transported to a series of conveyors containing driven augers with the conveyors forming a closed loop circulating path for the sludge. Means for heating and circulating air around the conveyors without contacting the sludge as well as means for heating and circulating air through the sludge are provided. A sensor determines moisture content and activates a means for discharging the sludge when the moisture content of the sludge reaches a predetermined level.

Thus, as may be seen from a review of the patients discussed above, all known prior art pyrolytic systems or devices are complicated in design and operation, inefficient, and generally produce unwanted or unnecessary products and byproducts of incomplete combustion including contaminated wastewater, oils, tars and sludge. The need remains to have a system to provide improved and optimum conditions for time, temperature and turbulence of materials in the absence of air and pressure to efficiently and safely produce products having desired chemical compositions and properties. A further need is to have the process consistent with the system to control chemical reactions of the products and further process those products to form additional and more desirable products which can be easily separated and used within and outside the process.

SUMMARY OF THE INVENTION

Thus, one object of the system and process of this invention is its operation and control to provide thermo-chemically pure pyrolysis (flash distillation) of moist organic materials. This object is to form steam, combustible gases and carbonaceous intermediate products. The system and process is to use the heated gases to activate carbon and fixate ash; displace hydrogen from steam; form a condensate to cool, scrub the gases, and quench the solids, recycle that condensate as scrub water to absorb gases; generate an activated carbon to filter, adsorb and separate the intermediate products; generate a combustible gas product; and regenerate that activated carbon product.

A further object of the invention is to provide adsorbate regeneration to recover the adsorbed components and produce additional hydrogen from water. Adsorption by chemical bonding of solids, gases or liquids to the surface of a solid is a known phenomenon to be used. Adsorption is utilized herein to separate and avoid costly interruption of the continuous flow process without materials entering the process other than the planned feedstock. The object is to have the system and process produce activated carbon from the feedstock as the adsorbent to regenerate and reactivate the activated carbon by temperature swing adsorption and steam reforming within the process as a closed-end system.

Another object of the invention is to define a modular plant system capable of uninterrupted production of thermal and/or electrical power at a lower cost, with higher efficiencies and with a reduced mass of cleaner products of conversion than the traditional Rankine cycle method and other heat engines presently employed by large utility type electrical power plants.

A further object of the invention is to apply advanced technology to provide a process and a combination of components to efficiently and economically convert organic waste materials including renewable agricultural materials and those environmentally unacceptable in an industrial boiler, including hazardous wastes and the like into thermal and/or electrical power and an activated carbon matrix.

The respective product gas from conversion of a wide range of materials is consistent in terms of the major components being hydrogen, carbon monoxide, carbon dioxide and methane. The respective carbon matrix is composed of activated carbon and a chemically fixated ash portion in that the sulfur, halogens and metals are fixated with the carbon and the matrix is, therefore, stable. High sulfur coal materials are converted whereby the sulfur and ash are contained in the carbon matrix and are not a part of the gas product. The processed gas product may be used to fuel gas engines or turbine-generators without causing deterioration, detonation or deration. Selected constituent gases of the gas product may be processed as a gaseous feedstock to produce alcohols such as methanol, ethanol and butanol for blending with gasoline for vehicular usage, to produce carbon black and other specialty carbon products free of ash components, or otherwise distributed as a net product for public consumption.

These as well as other objects may be achieved by providing a process for producing usable gaseous fuel and a carbonaceous an inert solid from a substantially organic feedstream such as municipal wastes comprising subjecting the feedstream to flash pyrolysis at a temperature of from about 700 to about 2400 F. to form intermediate solid and gas products; subjecting the intermediate products to a series of water sprays thereby creating a superheated steam with at least the first of said water sprays and later water sprays cooling and condensing the products, scrubbing and contracting the gases, and forming a slurry with the solid product; separating the gas from the slurry; scrubbing and drying the gas to remove selected compounds; draining the water from the solid in the slurry; and drying the solid.

Such objects are also achieved by providing a combustible gas mixture of carbon monoxide, hydrogen and lower hydrocarbons which is produced by the process comprising the steps of selecting an organic waste feedstream, subjecting the feedstream to flash pyrolysis for a length of time sufficient to generate and crack hydrocarbons, thereby producing an intermediate product solid and an intermediate product gas mixture, spraying water onto the intermediate products thereby decreasing the volume and mass of the product gas mixture, increasing the mass of the product solid and further cooling both products, and separating the gas mixture from the solid.

Such objects are also achieved by providing a usable, activated carbon product produced by the process comprising the steps of selecting an organic waste feedstream, subjecting the feedstream to flash pyrolysis thereby producing an intermediate carbon product and a gas mixture including hydrogen, carbon monoxide and hydrocarbons, separating the intermediate carbon product from the gas, subjecting the intermediate carbon product to further pyrolysis, thereby liberating and cracking hydrocarbons and reforming steam to produce additional hydrogen gas and reactivate of the carbon, and separating said hydrocarbons and hydrogen gas from the activated carbon.

Such objects are also achieved by providing a modular flash pyrolysis type plant system to produce an activated carbon matrix product and a clean combustible gas product from an organic feedstock materials which includes at least one feedstock receiving unit to accept, hold and convey a feedstream of at least one solid organic feedstock material, a pair of insulated pyrolytic apparatus to receive, contain convey and convert the solid feedstock material at approximately atmospheric pressure and thereby producing and discharging intermediate solid and gas products being both a solid activated carbon type product and a gaseous hydrocarbon type mixture, wherein said pyrolytic apparatus has a cavity radiator being at least one gas burner unit to provide the heat of pyrolytic conversion, a jacketed conveyor unit to accept, contain and convey the intermediate products from each one of the pyrolytic apparatus and allow the temperature of said intermediate products to be reduced by association with ambient air within a jacket around an covered and enclosed portion of the jacketed conveyor, a spray water section or segment to receive, contain, convey and convert the intermediate products from each one of the jacketed conveyor units, wherein a spray of water is added to the intermediate products to adjust the amounts of hydrogen, steam, carbon dioxide and carbon monoxide in the intermediate mixture to form an enhanced gas mixture and a carbon slurry product when the flow rate of additional spray water is adjusted to further regulate the temperature of said feedstream, at least one plate tower gas scrubber unit to accept the carbon slurry and enhanced gas mixture from the spray water section and divide the carbon slurry product from the enhanced gas mixture such that the cooled total product stream is separated, at least one gas mixture processing unit where the enhanced gas mixture is received from each gas scrubber unit to be processed for storage as a combustible gas mixture in a combustible gas storage unit as well as transported to at least one other energy producing unit of the plant including the pyrolytic apparatus for use as a combustible fuel in at least the cavity radiator burner units of the pyrolytic apparatus to help produce the heat for pyrolysis, at least one air supply system including a blower unit and air duct piping to provide the oxygen of combustion in at least the pyrolytic apparatus burner units, said air duct piping for each pyrolytic apparatus burner unit is connected with a jacket on the jacketed conveyor to increase the temperature of the ambient air of combustion and thereby increase the thermal efficiency of the plant, at least one dewatering assembly including a drain bin, an inclined dewatering conveyor and a quench tank to receive and dewater the carbon slurry pumped from a lower outlet port of the gas scrubber unit, wherein a major portion of the water is removed from the carbon slurry and returned to at least the gas scrubber unit and the spray water section and a wet activated carbon product is produced, and at least one regenerating apparatus to receive, contain, convey and covert the wet activated carbon product from at least one respective dewatering assembly, said regenerating apparatus having at least one cavity radiator being an outer jacket portion containing hot exhaust gases from another respective cavity radiator for further drying and pyrolysis of the activated carbon product thereby producing additional gaseous products and a dry enhanced activated carbon matrix, wherein the additional gaseous products are discharged from the regenerating apparatus by a gas outlet pipe to the spray water section and the enhanced activated carbon matrix is discharged from a carbon outlet port by an inner conveyor system including an auger, each said cavity radiator portion further having at least one exhaust port to discharge the hot exhaust gasses, whereas the activated carbon matrix and the combustible gas mixture is available for public use.

Still further objects are achieved by providing a system for converting organic feedstock material having an optimum moisture content into a combustible gas mixture and an activated carbon product which includes a pyrolytic apparatus that converts the feedstock by flash pyrolysis into an intermediate solid and gas mixture using a cavity radiator having a first burner to provide a radiant heat and energy environment with a temperature in the range of about 700 degrees Fahrenheit to about 2400 degrees Fahrenheit, the pyrolytic apparatus having an exhaust gas in a somewhat lower range of temperatures, a spray water section that receives the intermediate mixture from the pyrolytic apparatus and has a water spray system that adjusts the relative amounts of hydrogen, steam, carbon dioxide and carbon monoxide in the intermediate mixture to provide an enhanced intermediate mixture and cools the enhanced intermediate mixture to below 212 degrees Fahrenheit, said water coming from the moisture in the feedstock, a gas separator/scrubber that separates and scrubs the enhanced intermediate mixture from the spray water section to provide a combustible gas mixture and a carbon slurry, a portion of said combustible gas mixture being used for said first burner and optionally a second burner, a dewatering assembly that removes a major portion of the water from the carbon slurry coming from the gas separator forming a wet carbon product and filtered water and thereby provides the water for the spray water section and the gas separator unit, an optional regenerating apparatus that uses the hot exhaust gas from the pyrolytic apparatus to further dry and pyrolytically convert the wet carbon product from the dewatering unit into a dry activated carbon, said optional regenerating apparatus further discharging steam and gases to the spray water section and said regenerating apparatus to be provided based on a predetermined state of activation of the wet carbon, and an optional drying apparatus having a cavity radiator to provide heat and energy to additionally remove moisture from at least a portion of the wet activated carbon product from the dewatering assembly provided the moisture content of the wet carbon product is more than about 30 percent by mass, said optional drying apparatus to return a moist activated carbon product to the optional regenerating apparatus, if available, for further drying and conversion into a dry, enhanced and activated carbon product, said drying being required if the optional regenerating apparatus does not exist in the system, wherein the cavity radiator for drying uses the hot exhaust gas from the cavity radiator for pyrolyzing and wherein steam and gases from drying the wet activated carbon are transported to the spray water section, wherein a usable activated carbon product is discharged for public consumption.

Such objects are also achieved by providing a retort system characterized by at least one tubular retort with an internal auger being indirectly heated by radiant heat and energy within an exhaust manifold of a gas engine-generator and including a) means to convey a moist organic feedstock to each retort and thereby provide an air seal, b) means to displace entrained air from the feedstock, c) means to endothermically evolve steam from the feedstock thereby drying the feedstock, d) means to form a steam interface as an additional air seal, e) means to pyrolyze the dried feedstock to form combustible gases and a solid carbon product mass, f) means to turbulate, mix and chemically react the steam, combustible gases and the solid carbon mass, g) means to ignite endothermic reactions within at least one retort at approximately atmospheric pressure, h) means to provide continuous forward reactions by removal of combustible gases and carbon products, i) means to sweep any retort of particulates and other accumulated material, j) means to crack the combustible gases, k) means to reform steam and activate the solid carbon mass to produce additional hydrogen, activated carbon and other like products, l) means to convey the solid carbon mass out of the system, m) means to separate and provide a conduit for the combustible gases to reach the intake of the gas engine thereby energizing the gas engine-generator, n) means to provide mechanical or electrical energy to drive said internal auger, and o) means to provide thermal energy for heating said each retort, whereby the feedstock is converted to usable energy to realize an increased amount of electrical energy over a conventional Rankine cycle or other heat engine-generator system.

Such objects are further achieved by a system of apparatus each having at least two retorts mounted within and without a cavity radiator, said retorts being interconnected and enclose augers for continuous transport of a feedstock mass, wherein each retort has a predetermined temperature therein created by controlling radiant heat and energy released within a respective cavity radiator including, a means for transforming a moist organic feedstock within a first retort and thought one or more other interconnected retorts in a first pyrolytic apparatus, a means for converting the intermediate feedstock to intermediate combustible gas and carbon products in the first pyrolytic apparatus, a means for spraying water on respective intermediate products from the first pyrolytic apparatus to produce an enhanced combustible gas and an activated carbon slurry within a spray water section, a means for separating the gas from the slurry and to further separate water from the carbon slurry to produce a further enhanced combustible gas product and a wet activated carbon product and a means for heating, drying and converting the wet activated carbon product from the separating means within at least one other pyrolytic apparatus to produce a dry and more highly activated carbon product.

Such objects are also achieved by providing a self-sustaining system for converting an organic feedstream into a combustible gas and a solid, usable, activated carbon product which includes a plurality of interconnected retorts for transporting the feedstream and resultant products through the system, the retorts enclosing augers for conveying the feedstream and products through each retort and to and between respective retorts; at least two cavity radiators, the retorts extending into, through, and out of the cavity radiators for transferring heat and energy to the feedstream, wherein said cavity radiators comprise: a first cavity radiator for drying said feedstream by transferring heat and energy to and through the at least one retort extending through said first cavity radiator and containing a portion of the feedstream therein; and a second cavity radiator for at least pyrolyzing said feedstream by transferring heat and energy to and through the at least one retort extending through said second cavity and containing a portion of the feedstream therein, thereby forming a gas product and a carbon product, said second cavity including at least one burner for heating said second cavity to a temperature sufficient for pyrolysis; means for directing exhaust gases from said second cavity radiator into said first cavity radiator whereby the exhaust heat from said second cavity radiator provides heat for said drying of the feedstream subsequent to an initial start-up with an outside heat source; means for directing exhaust gases from one of said cavity radiator to preheat air of combustion for fueling said at least one burner; a retort section of a retort extending out of said second cavity radiator, said retort section comprising means for introducing a water spray onto the gas product and carbon product thereby cooling said products and forming a carbon slurry and an altered gas product; means for separating the altered gas product from the carbon slurry and for directing at least a portion of the altered gas product to said at least one burner within said second cavity radiator; and means for draining water from the carbon slurry, thereby producing filtered water and a wet carbon product, and directing at least a portion of the filtered water to said means for introducing a water spray onto the gas product and carbon product within said retort section.

Such objects are also achieved by providing a self-sustaining system for converting an organic feedstream into a combustible gas and a solid, usable, activated carbon product which includes a plurality of interconnected retorts for transporting the feedstream and resultant products through the system, the retorts enclosing augers for conveying the feedstream and products through each retort and to and between respective retorts; at least three cavity radiators, the retorts extending into, through, and out of the cavity radiators for transferring heat and energy to the feedstream, wherein said cavity radiators comprise: a first cavity radiator for at least drying said feedstream by transferring heat and energy to and through the at least one retort extending through said first cavity radiator and containing a portion of the feedstream therein; a second cavity radiator for at least pyrolyzing said feedstream by transferring heat and energy to and through the at least one retort extending through said second cavity and containing a portion of the feedstream therein, thereby forming an intermediate gas product and an intermediate carbon product; and a third cavity radiator, wherein one of said second and third cavity radiators include at least one burner for heating said cavity to a temperature sufficient for pyrolysis; a retort section of a retort extending out of said second cavity, said retort section comprising means for introducing a water spray onto the intermediate gas product and intermediate carbon product, thereby cooling said products and forming a carbon slurry and an altered gas product; means for separating the altered gas product from the carbon slurry and for directing at least a portion of the altered gas product to said at least one burner, whereby said burner is fueled by the altered gas product subsequent to an initial start-up with an outside fuel source; means for draining water from the carbon slurry, thereby producing filtered water and a dewatered carbon product, and directing at least a portion of the water to said means for introducing a water spray onto the intermediate products within said retort section; means for directing said dewatered carbon product into at least one retort extending into and through said third cavity radiator, said third cavity radiator at least pyrolyzing said dewatered carbon product by transferring heat and energy to and through the at least one retort extending into and through said third cavity radiator and containing said dewatered carbon product, thereby forming a carbon end product and further altered gas product; means for directing exhaust gases from said cavity having said at least one burner to the other two of said cavities whereby the exhaust heat from said cavity having said at least one burner provides heat for said drying of the feedstream subsequent to an initial start-up with an outside heat source and the exhaust heat from said cavity having said burner provides heat for pyrolysis to the other of said second and third cavities; and means for directing exhaust gases from one of said cavities to preheat air of combustion for fueling said at least one burner.

Such objects are also achieved by providing a self-sustaining system for converting an organic feedstream into a combustible gas and a solid, usable, activated carbon product comprising: a plurality of interconnected retorts for transporting the feedstream and resultant products through the system, the retorts enclosing augers for conveying the feedstream and products through each retort and to and between respective retorts; at least two cavity radiators, the retorts extending into, through, and out of the cavity radiators for transferring heat and energy to the feedstream, wherein said cavity radiators comprise: a first cavity radiator for at least drying said feedstream by transferring heat and energy to and through the at least one retort extending through said first cavity radiator and containing a portion of the feedstream therein; and a second cavity radiator for at least pyrolyzing said feedstream by transferring heat and energy to and through the at least one retort extending through said second cavity and containing a portion of the feedstream therein, thereby forming a gas product and a carbon product, said second cavity including at least one burner for heating said cavity to a temperature sufficient for pyrolysis; means for directing exhaust gases from said second cavity radiator into said first cavity radiator whereby the exhaust heat from said second cavity radiator provides heat for said drying of the feedstream subsequent to an initial start-up with an outside heat source; means for directing exhaust gases from one of said cavities to preheat air of combustion for fueling said at least one burner; a retort section of a retort extending out of said second cavity radiator, said retort section comprising means for introducing a water spray onto the gas product and carbon product thereby forming a carbon slurry; means for separating the gas from the carbon slurry and for directing at least a portion of the gas to said at least one burner within said second cavity radiator wherein said burner is fueled by the gas product of pyrolysis subsequent to an initial start-up with an outside fuel source; means for draining water from the carbon slurry, thereby producing filtered water and a wet carbon product, and directing at least a portion of the filtered water to said means for introducing a water spray onto the gas product and carbon product within said retort section; and a series of retorts interconnected with said retort section for transporting the wet carbon into, through, and out of the first drying cavity radiator and into, through, and out of the second pyrolyzing cavity radiator thereby forming an activated carbon product.

Such objects are further achieved by providing a self-sustaining system for converting an organic feedstream into a combustible gas and a solid, usable, activated carbon product which includes a plurality of interconnected retorts for transporting the feedstream and resultant products through the system, the retorts enclosing augers for conveying the feedstream and products through each retort and to and between respective retorts; a cavity radiator, the retorts extending into, through, and out of the cavity radiator for transferring heat and energy to the feedstream and at least pyrolyzing the feedstream by transferring heat and energy to and through the retorts containing at least a portion of the feedstream therein, thereby forming a gas product and a carbon product, said cavity radiator including at least one burner for heating said cavity radiator to a temperature sufficient for pyrolysis; a retort section of a retort extending out of said cavity radiator, said retort section comprising a heat exchange means for preheating air of combustion for said at least one burner and for cooling the gas product and carbon product: a further retort section of said final retort extending out of said cavity radiator, said further section comprising means for introducing a water spray onto the gas product and intermediate carbon product thereby further cooling said products and forming a carbon slurry and an altered gas product; means for separating the altered gas product from the carbon slurry and for directing at least a portion of the altered gas product to said at least one burner, whereby said burner is fueled by the altered gas product subsequent to an initial start-up with an outside fuel source; means for draining water from the carbon slurry, thereby producing filtered water and a dewatered carbon product, and directing at least a portion of the water to said means for introducing a water spray onto the carbon product and gas product within said further retort section.

Such objects are also achieved by providing a self-sustaining system for converting an organic feedstream into a combustible gas and a solid, usable, activated carbon product comprising a plurality of interconnected retorts for transporting the feedstream and resultant products through the system, the retorts enclosing augers for conveying the feedstream and products through each retort and to and between respective retorts; a cavity radiator, the retorts extending into, through, and out of the cavity radiator for transferring heat and energy to the feedstream and at least pyrolyzing the feedstream by transferring heat and energy to and through the retorts containing at least a portion of the feedstream therein, thereby forming a gas product and a carbon product, said cavity radiator including at least one burner for heating said cavity radiator to a temperature sufficient for pyrolysis; a retort section of a retort extending out of said cavity radiator, said retort section containing a gas product and a carbon product of pyrolysis and comprising means for introducing a water spray onto the gas product and intermediate carbon product thereby further cooling said products and forming a carbon slurry and an altered gas product; means for separating the altered gas product from the carbon slurry and for directing at least a portion of the altered gas product to said at least one burner, whereby said burner is fueled by the altered gas product subsequent to an initial start-up with an outside fuel source; means for draining water from the carbon slurry, thereby producing filtered water and a dewatered carbon product, and directing at least a portion of the water to said means for introducing a water spray onto the carbon product and gas product within said further retort section.

Such objects are further achieved by providing a self-sustaining system for converting an organic feedstream into a combustible gas and a solid, usable, activated carbon product comprising a plurality of interconnected retorts for transporting the feedstream and resultant products through the system, the retorts enclosing augers for conveying the feedstream and products through each retort and to and between respective retorts; a cavity radiator, the retorts extending into, through, and out of the cavity radiator for transferring heat and energy to the feedstream and at least pyrolyzing the feedstream by transferring heat and energy to and through the retorts containing at least a portion of the feedstream therein, thereby forming a gas product and a carbon product, said cavity radiator including at least one burner for heating said cavity radiator to a temperature sufficient for pyrolysis; and means for separating the gas product from the carbon product and for directing at least a portion of the gas product to said at least one burner, whereby said burner is fueled by the gas product subsequent to an initial start-up with an outside fuel source.

BRIEF DESCRIPTION OF THE DRAWINGS

Further features of the present invention will become apparent to those skilled in the art to which the present invention relates from reading the following specification with reference to the accompanying drawings, in which:

FIG. 4 is a longitudinal sectional view of a pyrolytic apparatus of this invention;

FIG. 10 is a block diagram of the essential components for conversion of an organic feedstock.

DETAILED DESCRIPTION OF THE PREFERRED EMBODIMENTS

Figure 1A:
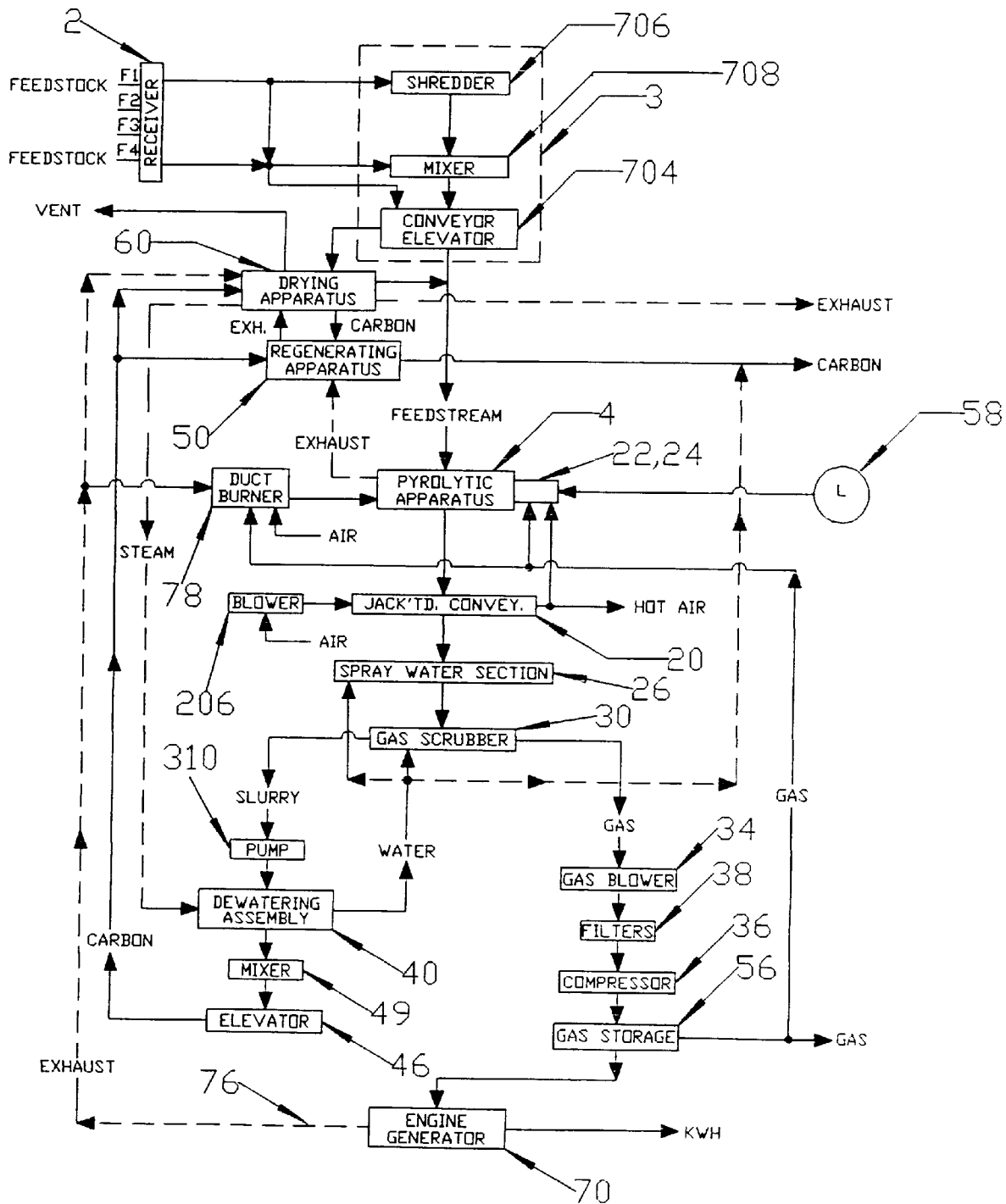
FIG. 1A is a block diagram showing the functional uses for the apparatus of the invention and the flow of products between apparatus.

The technology involved in this invention is based on the concept of pure pyrolysis. For purposes of the present invention the term "pure pyrolysis" is defined to mean that there is no mixture of the products of combustion with the products of pyrolysis as there is with partial pyrolysis or incomplete combustion. The waste stream is selected, blended and reduced to a predetermined particle size, dried or mixed with water or another material, and subjected to a temperature of from about 700 degrees Fahrenheit to about 2400 degrees Fahrenheit or higher at approximately atmospheric pressure without the presence of air. The feedstream is not incinerated or burned. There is no flue stack, no ash product nor any product of burning of the feedstock materials. The feedstock does not combust to form a flue gas, ash product or any product of burning of the feedstock. There is no necessary tar, oil or wastewater by-product; such materials can be avoided or produced if desired. Furthermore, higher thermal efficiencies are achieved than if the feedstock were burned as fuel for power.

Any organic waste feedstream, dry or wet, which is shredded to a particle size of approximately 2 inches or less, can be treated as feedstock treated by the apparatus and process of this invention. A wide range of viscosity and volatility of feedstock such as tires, industrial and municipal wastewater sludge, wastewater, fossil fuels, landfill waste, spent foundry sand, waste oil, automobile shredder residue, plastics, coated paper, contaminated soil, wood and crop residues and animal wastes can be successfully processed by the apparatus and process of this invention. Deleterious waste materials can be used as feedstock in the apparatus and process of this invention to produce value added products and to advance the art of environmental control of emissions.

The apparatus and process is operated and controlled to provide thermochemical pure pyrolysis of feedstocks selected. The system provides for drying followed by the formation of superheated steam, rapid decomposition by carbonization and sublimation of its organic solids, displacement of hydrogen from the steam and separation into desired and valued gas and carbon products. Separation is a process step whereby, after the mixture of materials and the chemical compounds comprising the composition of the feedstock are transformed into different chemical compositions and phases, those masses are divided as different products into separate containment. The apparatus and process optionally can provide desired oils, tars, waxes, carbon black, pitch, complex forms of carbon such as fullerenes, desalinated water and other like products. Condensation and adsorption with adsorbents which are generated within the process are preferred processing techniques rather than others, such as pressure and cryogenics for the select separation of mixed components within the process steam.

In its broadest sense the present invention is directed to an apparatus and a self-sustaining process for converting an organic feedstream into a combustible gas and a solid, usable, activated carbon product. The term "feedstream" is used interchangeably with "feedstock" herein to connote any of a variety of materials which may be treated and converted to usable end products by the present system and process. Basically, the system consists of a plurality of interconnected retorts which extend into, through, and out of at least one and, preferably, two or more cavity radiators. The feedstream and resultant products are conveyed through and between respective retorts by augers enclosed therein. The cavity radiators transfer heat and energy to and through the retorts in order to dry the feedstream or the products or both and to initiate any of a variety of chemical reactions, most especially pyrolysis, but also including cracking and reforming of hydrocarbons, activating of a carbon product and fixating of substances with the activated carbon product, all of which are discussed in greater detail below.

Specifically, a first cavity radiator may be provided for optional drying the feedstream, activated carbon product, or both. In certain embodiments such first cavity radiator may be considered to be a dryer, although the terms "dryer", "dryer apparatus" and "drying apparatus" are used interchangeably below in the discussion of particular embodiments of the present invention. The first cavity radiator transfers heat and energy to the retort or retorts extending therethrough in order to dry and preheat the feedstream contained within such retort or retorts. As will be noted below, intermediate products may also be directed through a retort or retorts which extend into and through the first cavity radiator for drying and preheating of such products prior to further processing by another of the same apparatus.

A second cavity of the same apparatus functioning as pyrolytic retorts in a cavity radiator is essential to the present invention. It is provided for at least pyrolyzing the feedstream or products contained in the retort or retorts extending therethrough. The second cavity radiator transfers heat and energy to the retort or retorts extending therethrough in order to at least pyrolyze the feedstream contained within such retort or retorts. As will be noted below, intermediate products may also be directed through another retort or retorts which extend into and through the second cavity radiator for further pyrolysis. Generally, the second cavity radiator includes at least one burner for heating the cavity to a temperature sufficient for pyrolysis, although, as will be noted below, in some cases a burner may be provided within yet a third cavity radiator for heating that cavity to a temperature sufficient for pyrolysis with the second cavity radiator receiving exhaust gases from the third cavity radiator at a temperature sufficient for pyrolysis of the contents of the retorts extending through the second cavity. Regardless of the heat source, the feedstream or intermediate products contained within retorts extending through the second cavity radiator are converted to a gas product and an activated carbon product therein.

In order for the system to be self-sustaining means are provided for directing at least a portion of the gas product to the at least one burner such that the burner or burners are fueled by the gas product of pyrolysis after an initial start-up period with an outside fuel source. Such outside fuel source may be, for example, liquid propane gas (LPG), natural gas, or the collected gas product of previous system runs in the operation of the present invention.

Another feature of the present self-sustaining process is that the exhaust gases from the second cavity radiator may be directed into the first cavity radiator in order to provide heat for drying of the feedstream or intermediate products after an initial start-up period with an outside heat source. As is noted below in the discussion of specific embodiments of the present invention, the said burner may be employed for the outside heat source for the initial availability of ample heated exhaust gases from the second cavity radiator to the first cavity radiator.

Furthermore, in order to improve efficiency of the present self-sustaining system there is preferably a means for directing exhaust gases from one of the cavity radiators to a means for preheating air of combustion for fueling the various burners. The air of combustion is preferably drawn in from the outside environment and may be preheated by a heat exchange arrangement with the exhaust gases. Or the air of combustion may be preheated by an alternative heat exchange means such as a jacket provided about a section of a retort extending out of the apparatus after pyrolyzing. Such preferred alternative heat exchange serves to preheat the air of combustion as well as to cool the gas and carbon products after pyrolysis.

In an optional retort configuration a section of a retort after pyrolyzing within the second cavity radiator extends out of the cavity and includes a means for introducing a water spray onto the gas product and carbon product formed by pyrolysis within the second cavity radiator. Such means for introducing a water spray may be subsequent to or in place of the jacketed heat exchange means provided about such retort section. The water spray also cools the products and, additionally, forms a carbon slurry and an altered gas product. As will be discussed in greater detail below, the initial gas product and carbon product may be altered chemically by reactions with the steam formed by such water spray. Such altered gas product is separated from the carbon slurry and a portion of it may be directed to the burners within the system in place of the unaltered gas product of pyrolysis discussed above. Thereafter, the water is drained from the carbon slurry forming filtered water and a dewatered carbon product. The water is filtered by draining through the carbon product which has been activated by pyrolysis. At least a portion of the filtered water is then directed to the means for introducing a water spray, such filtered water forming said water spray.

It should be noted that if a single pyrolytic apparatus is employed in accordance with the present invention then the initial retort or retorts extending through such cavity radiator serve to dry the feedstream prior to pyrolysis. Such drying produces an excess of steam which must be separated from the feedstream in order to avoid interference with the pyrolytic reactions occurring in later retorts. Although the steam may be vented to atmosphere, it is more preferably directed to condense into the carbon slurry where the condensate of such steam assists in the cooling and scrubbing of the carbon product as is discussed in greater detail below with respect to specific embodiments.

In a further optional configuration a third cavity radiator is provided for at least further pyrolyzing intermediate products. After the water is drained from the carbon slurry the dewatered carbon product is directed into a retort or retorts extending into and through the third cavity radiator for refining the carbon product. The dewatered carbon may first be dried and preheated such as by routing through retorts within the first cavity radiator, prior to introduction to the retorts of the third cavity radiator.

In yet another optional configuration the dewatered carbon is routed through a retort or retorts within the first cavity radiator for drying of the carbon product then through a retort or retorts within the second cavity radiator for further pyrolyzing of the dewatered carbon product. In its second pass through retorts mounted in first and second cavity radiators the carbon product is routed through retorts which extend into, through and out of such cavities which are present in addition to the initial retorts through which the feedstream was routed in the first pass. That is, the interconnected retorts of the present system form a closed end sub-system, discussed in greater detail below, which conveys the feedstream and resultant products through all retorts for indirect heating within each respective cavity radiator. For the present optional configuration the closed end system of interconnected retorts loops back around and extends a second time through the first and second cavity radiators.

Looking to specific preferred embodiments of the present invention, functional components or units which are essential or optional and make up the system for processing of feedstock are shown in FIG. 1A. Not all components are required depending on the nature of the feedstock and the desired output of the system. The feedstock enters the receiver unit 2 and can pass through a shredder 706 and a mixer 708, before being transferred by a conveyor elevator 704 to the essential pyrolytic apparatus 4. The receiver unit, shredder, mixer and conveyor elevator are all preferred but nonessential elements of the present system. A preferred shredder is an LW-421 (R) Vortex Disintegrator (TM) supplied by Light Works, Inc., Mondovi, Wis.; a preferred conveyor elevator for use in the present system is the Redler Conveyor supplied by Stevens-Adamson, Pittsburgh, Pa. Pyrolytic burners 22,24 provide the heat of pyrolysis, with startup heat provided by a liquid petroleum gas (LPG) storage vessel 58. The jacketed conveyor 20 receives, contains, cools and conveys an intermediate solid and gas mixture and serves to preheat the air to the burners 22,24. The spray water section 26 further processes, contains, cools and conveys the intermediate mixture with a spray of water before discharging a carbon slurry and an altered gas mixture into a gas scrubber 30. The gas scrubber 30 separates the carbon slurry to a pump 304 and transfers the scrubbed, cooled and dried gas mixture to a gas blower 34 as a combustible gas mixture. The combustible gas mixture is transported through the filters 38 to a compressor 36 and on to a gas storage 56. The combustible gas mixture is a calorific energy source and can be sold as a fuel. For example, the combustible gas mixture can be used satisfactorily in a gas engine-generator 70 to generate electrical power (kWh).

The carbon slurry from the gas scrubber in FIG. 1A is best utilized after further processing. A dewatering assembly 40, having a drain bin 42, an inclined dewatering conveyor 44 and mixer 49 and an elevator unit 46, separates most of the water from the carbon slurry producing a wet, activated carbon product. The wet, activated carbon can be transported directly to a regenerating apparatus 50 for further processing or optionally to a drying apparatus 60 for removal of additional moisture before going to the retorts for regenerating. A duct burner 78 can also be provided in the exhaust duct from the engine-generator 70 to increase the temperature of the exhaust gas to the regenerating apparatus 50 and/or the drying apparatus 60. After further processing, including pyrolysis and reactivation, in the regenerating apparatus 50, the more highly activated carbon becomes a product having many uses in the industry.

Figure 1B:
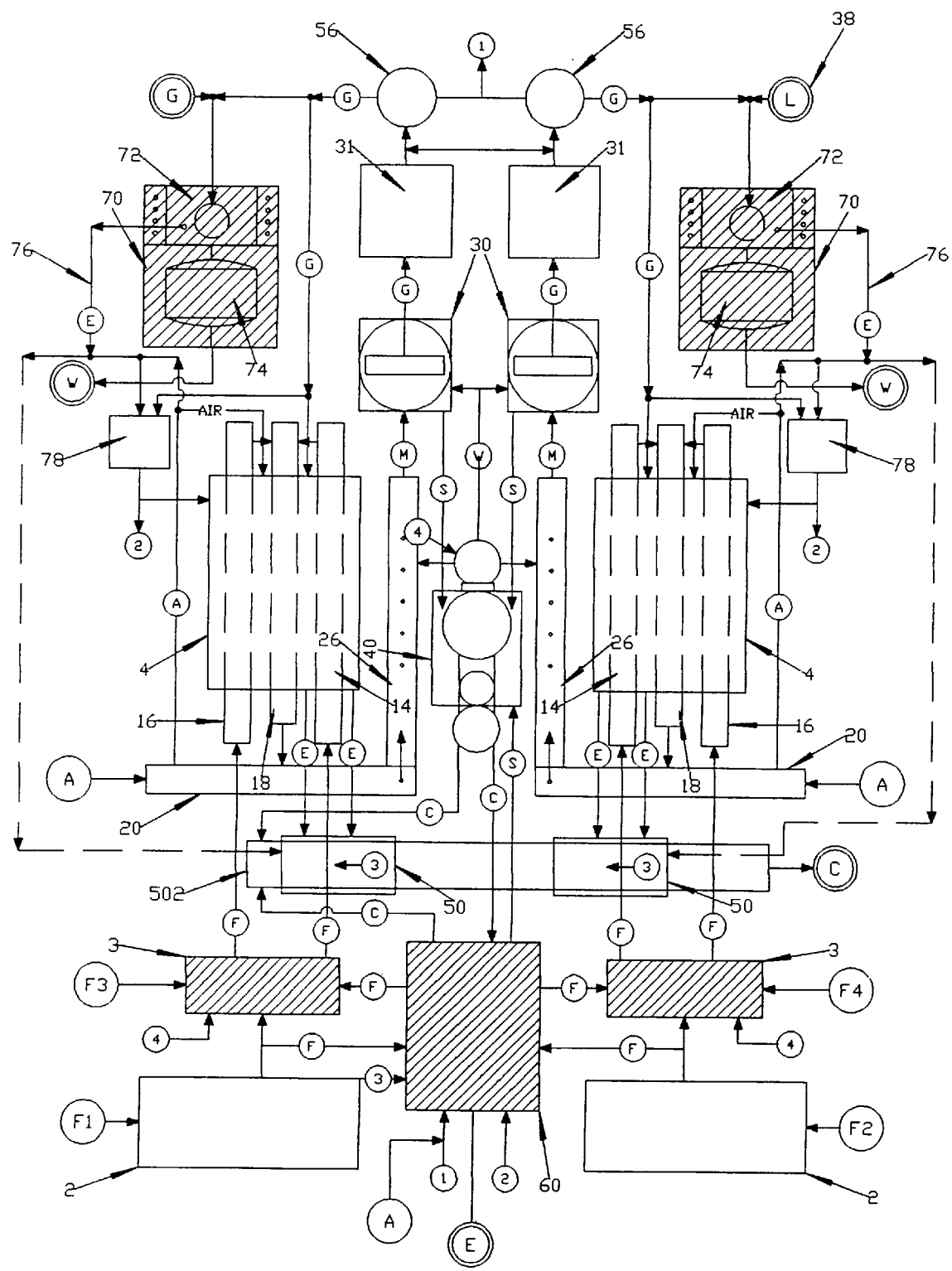
FIG. 1B is a block diagram of the modular type pyrolysis plant system of this invention.

A block diagram of the modular apparatus and process of this invention is illustrated in FIG. 1B. This illustration is used to help describe the various functional units of the invention and to describe their relationships one with the other, as well as what products are interchanged between units. Generic product names are used at this stage and only general operational features of the units are discussed. Detailed descriptions of the processes and products produced by these processes are disclosed later in this specification section. That is, the features of the overall modular pyrolytic system and process are given herein to better understand the essential and optional features of an actual plant. One important consideration is the extent of dual pyrolyzing apparatus for continuous operation of the system while performing operational checks and doing maintenance tasks on one apparatus. A second important consideration is in having optional components or units to be able to have flexibility within the process to select various feedstock and adjust to accommodate the condition of these materials as they are received for processing. Operational control of the process and selection of the feedstock determine the quality and quantity of desired products. A description of the plant control system is also included later in this specification.

The two pyrolytic apparatus 4, as illustrated in FIG. 1B, are most essential to continuous modular operation of the plant. The feedstock (F) comes from two components being the receiving unit 2 and the material processing system 3. The material processing system 3 is shaded in FIG. 1B to show that it is optional. Such system can comprise any number of other components including a shredder, a mixer with a water spray device and a conveyor to place the feedstock in a proper condition and position for charging the first pyrolytic apparatus retort or retorts 14, 16. The need for any or all of these components depends on the "condition" of the raw feedstock F1–F4. This condition can be size, consistency, moisture content, odor, calorific content and the like. It is possible to receive the raw feedstock that it can go directly into the first pyrolytic apparatus retort or retorts 14,16 with only minimal handling and conveying by the receiving unit 2. If further drying of a portion of the selected feedstock F3,F4 is desired after the material processing system 3, this feedstock can be sent through the first drying apparatus retort 66, to remove a predetermined amount of moisture, and then directed back into the feedstream and on to the first pyrolytic apparatus retort or retorts 14,16. It is possible to serve more than one pyrolytic apparatus 4 with a single receiving unit 2 and, if desired, a single material processing system 3. However, a second receiving unit 2 and another material processing system 3 is preferred for ease of maintenance and for the ability to receive different feedstock materials at one time.

Two additional components are preferred for association with each pyrolytic apparatus 4 or each module of two such apparatus, being a jacketed conveyor 20 and a spray water section 26 as illustrated in FIG. 1B. These units receive an intermediate mixture of a solid carbon product and a gaseous product and conveys this hot intermediate mixture by augers in enclosed covers. The jacket around the jacketed conveyor 20 is to heat the ambient air (A) from a blower unit and provide hot air for at least one burner unit. As a result of heating the air, the intermediate mixture is reduced in temperature in the jacketed conveyor 20. This is not an essential feature of the plant but does increase its thermal efficiency. The spray water section 26 incorporates a spray of water from a dewatering assembly 40 to cool, condense, scrub and dry the gas mass and to reduce the reactivity of the activated carbon mass by producing a carbon slurry. The dewatering assembly 40 separates the filtered water and wet activated carbon in the inclined conveyor 44.

A plate tower gas scrubber (or separator) 30 is preferred to separate the mixture (M) of carbon slurry and enhanced gas mixture directed from the spray water section 26. This unit is standard in the industry; a preferred scrubber is the Impinjet (R) manufactured by W.W. Sly Manufacturing Co. of Strongsville, Ohio. The two product streams coming from the gas; scrubber are the scrubbed enhanced gas mixture (G) and the carbon slurry (S), see FIG. 1B. These two product streams will be discussed in separate sections below. Once again, it may be possible to have an assembly as simple as a tee in the piping to separate the gas and carbon slurry or to have only one gas scrubber unit per plant module. However, two gas scrubber units are preferred so that the gas mixture output from one pyrolytic apparatus can be adjusted and monitored for the one pyrolytic apparatus without changing the operation of the other pyrolytic apparatus. This allows the end results of the pyrolytic conversion to be studied in half of the plant while the processing of feedstock continues in the other half of the plant, thereby such redundant independence enhances continuous operation and controlled monitoring for quality.

The processing of the enhanced gas mixture may be in separate units as illustrated in FIG. 3 where a gas blower 34, a gas filter unit 38 and a compressor 36 are utilized. The end result is a combustible gas mixture (G) available for use as a fuel (FIG. 1B). The combustible gas mixture can be stored in either one of the two gas storage units 56 for public consumption or used in the plant. The use of high pressure or cryogenics to liquify the gas is not preferred. In fact, an important aspect of the present invention is the provision of a means for safe use of an immediately accessible source of fuel in the form of the feedstock to produce the gas rather than large storage of the gas. one excellent use of the combustible gas mixture is to provide the fuel for the burners 22,24 (FIG. 4). The preheated combustion air (A) is mixed with the combustible gas mixture (G) to provide the cavity radiator heat and energy transfer in the pyrolytic apparatus 4. This use of the combustible gas mixture is preferred as it makes the plant self-sustaining. Use of that gas to support a gas engine-generator 70 whose exhaust 76 is directed to the pyrolytic apparatus is also a preferred mode of operation for a self-sustaining system. A liquid petroleum gas (LPG) storage unit 58 is provided to have LPG fuel for the said burners during initial startup of the plant. This; LPG fuel, or other fuels such as natural gas or fuel oil, can be the fuel for the pyrolytic apparatus on a continuous basis, however, this is not preferred. Another use of the combustible gas mixture (G) within the plant is for optional regenerating apparatus burners. Use of the combustible gas mixture (G) for optional drying apparatus burners is less preferred as recovered heat by use of exhaust from the pyrolytic apparatus or the gas engine-generator or both is more efficient.

Figure 3A:
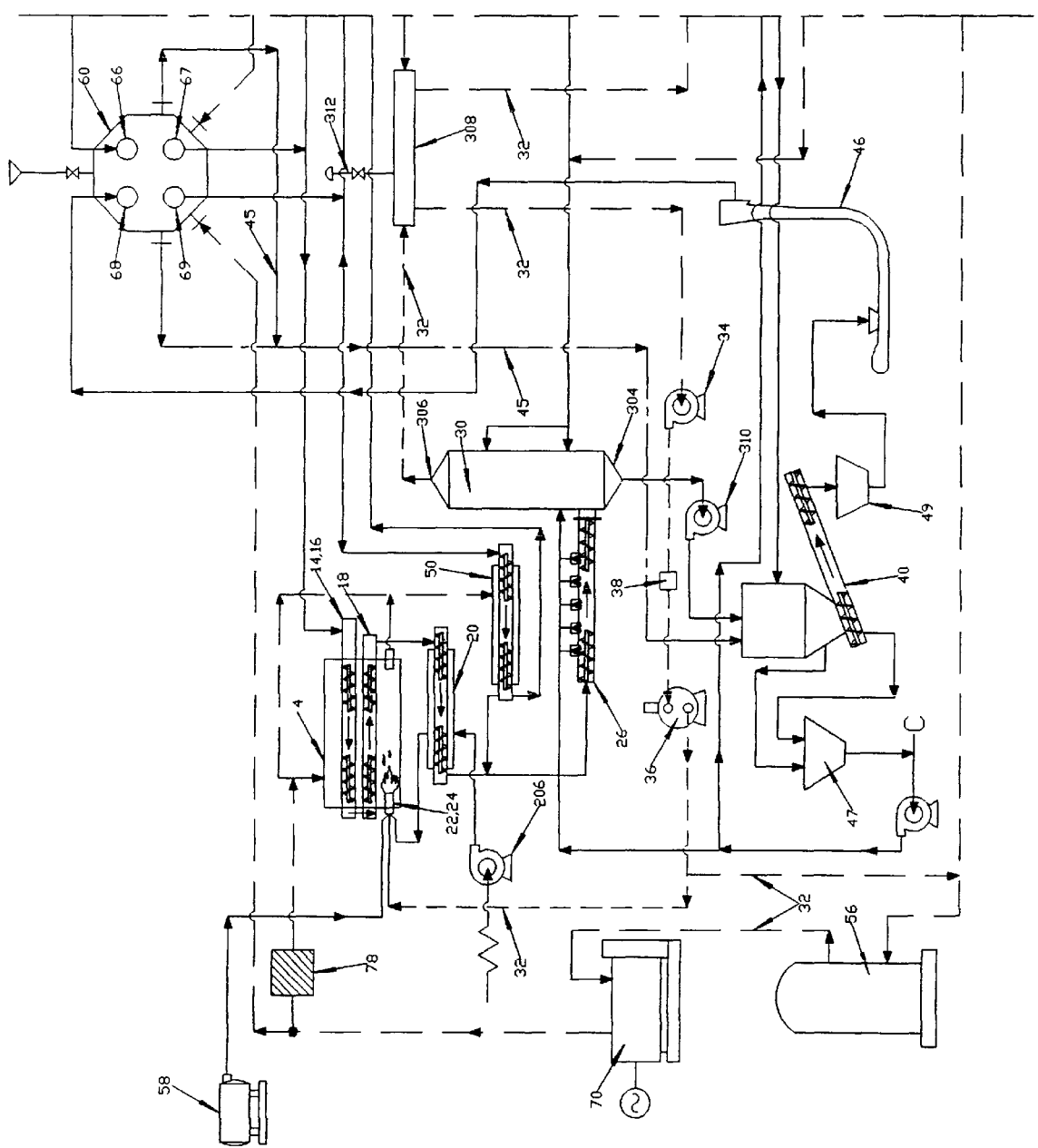
FIGS. 3A–B is a flow diagram of the modular plant product stream for this invention.
Figure 3B:
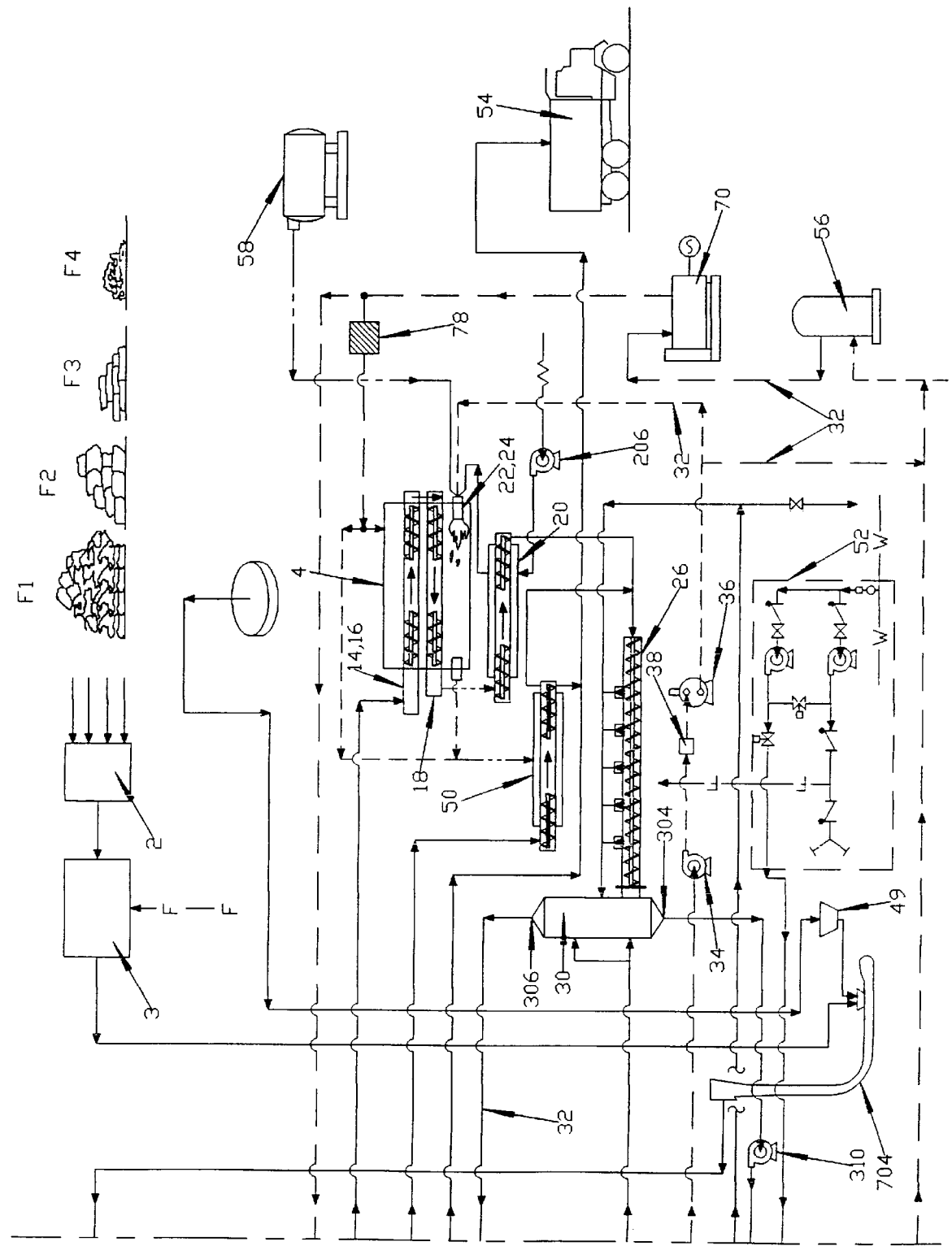

A very efficient use of the combustible gas mixture is to provide the fuel for the gas engine-generator 70, as illustrated in FIG. 1A. The combustible gas mixture combines with ambient air from outside of the closed-end system to run a gas engine 72 which is connected to a generator 74. A direct supply of electrical energy (W) is available directly to and from the plant. There are two gas engine-generator units 70 to provide for maintenance of each unit without interrupting the power output. Each gas engine-generator unit can run by use of the gas product output of either pyrolytic apparatus by interconnecting units as shown in FIGS. 3A and 3B. A source of energy is available to and from the plant as a stored combustible gas mixture or as electrical power. The gas engine-generator units are not essential in providing this source of energy, however, an energy product in the form of electrical power is easier and more efficient to transport for public consumption. The gas engine exhaust (E) can also be utilized for a number of purposes. If an exhaust duct burner unit 78 is provided on the gas engine exhaust duct 76, the hot exhaust gases can help provide the heat for pyrolytic conversion in the pyrolytic apparatus 4. Furthermore, it may be feasible to not have to use the pyrolytic apparatus burners to achieve the necessary heat of pyrolysis, and thereby achieve a more energy efficient process. Another use of the gas engine exhaust is to provide heat for the regenerating apparatus 50. This heat can also be enhanced by using the duct burner 78.

The carbon slurry portion (S) of the products from the gas scrubber unit 30 are pumped to a dewatering assembly 40 for separation of the water (W) from the carbon product (C). It is possible to have an acceptable, safe and usable carbon product as an output from the dewatering assembly 40. This depends on the composition of the feedstock coming into the plant and the amount of the activated carbon or reactivated carbon product used within the process to adsorb and fixate undesirable components. The filtered water from the drain bin of the dewatering assembly can be used in the gas scrubber 30, as a water source for the spray water section 26 and/or for spray water in the material processing system 3. A potable filtrate is also possible from the dewatering assembly for public consumption by selecting feedstock and optional components of the process to produce a high quality activated carbon product for use as a carbon filter. Two options are provided to further process the carbon product (C). For the first option at least a portion of the activated carbon product may be further dried in the drying apparatus retort to remove a predetermined amount of the moisture remaining in the carbon product after removal from the dewatering assembly. The still slightly moist activated carbon product from drying apparatus 60 is then directed to the regenerating apparatus 50 for additional drying and processing of the carbon to produce the activated carbon end product. In a second option only a regenerating apparatus 50 is provided to dry the wet carbon product as well as to provide pyrolysis of adsorbed volatiles, fixation and reactivation of the activated carbon product to produce the activated carbon end product.

The regenerating apparatus 50 is a preferred, although not necessary, component of the total plant. The moist activated carbon product has adsorbed and absorbed substances which are to be fixated within the carbon mass. For example, chlorine may be present and the transport of the carbon matrix back through a pyrolytic retort, such as the regenerating retort, can fixate the chlorine into the carbon matrix. Heat for pyrolytic regeneration, fixation and reactivation within the regenerating apparatus may come from the pyrolytic apparatus exhaust gases that pass through the cavity radiator jacket 502 of the regenerating apparatus. An exhaust port 518 is provided to discharge these exhaust gases from the cavity radiator jacket. The exhaust port can also be connected to the drying apparatus cavity radiator, if one is employed, to provide heat for the drying processes. Alternatively, a regenerating apparatus may have one or more burners mounted in that cavity radiator. As another option a regenerating retort or retorts may be mounted in the pyrolytic apparatus cavity radiator such that a separate regenerating apparatus cavity radiator is not required. Regardless of the path of the regenerating retort, the further pyrolysis of the carbon product produces additional gases. In the preferred embodiments, these gases are returned by the regenerating apparatus cavity radiator outlet port 512 to the inlet port 300 of the spray water section (FIG. 6) and become a part of the intermediate gas mixture. The activated carbon product continues through the regenerating retort and becomes a dry, enhanced activated carbon (C) when discharged for public consumption from the regenerating retort outlet port 514.

Figure 2:
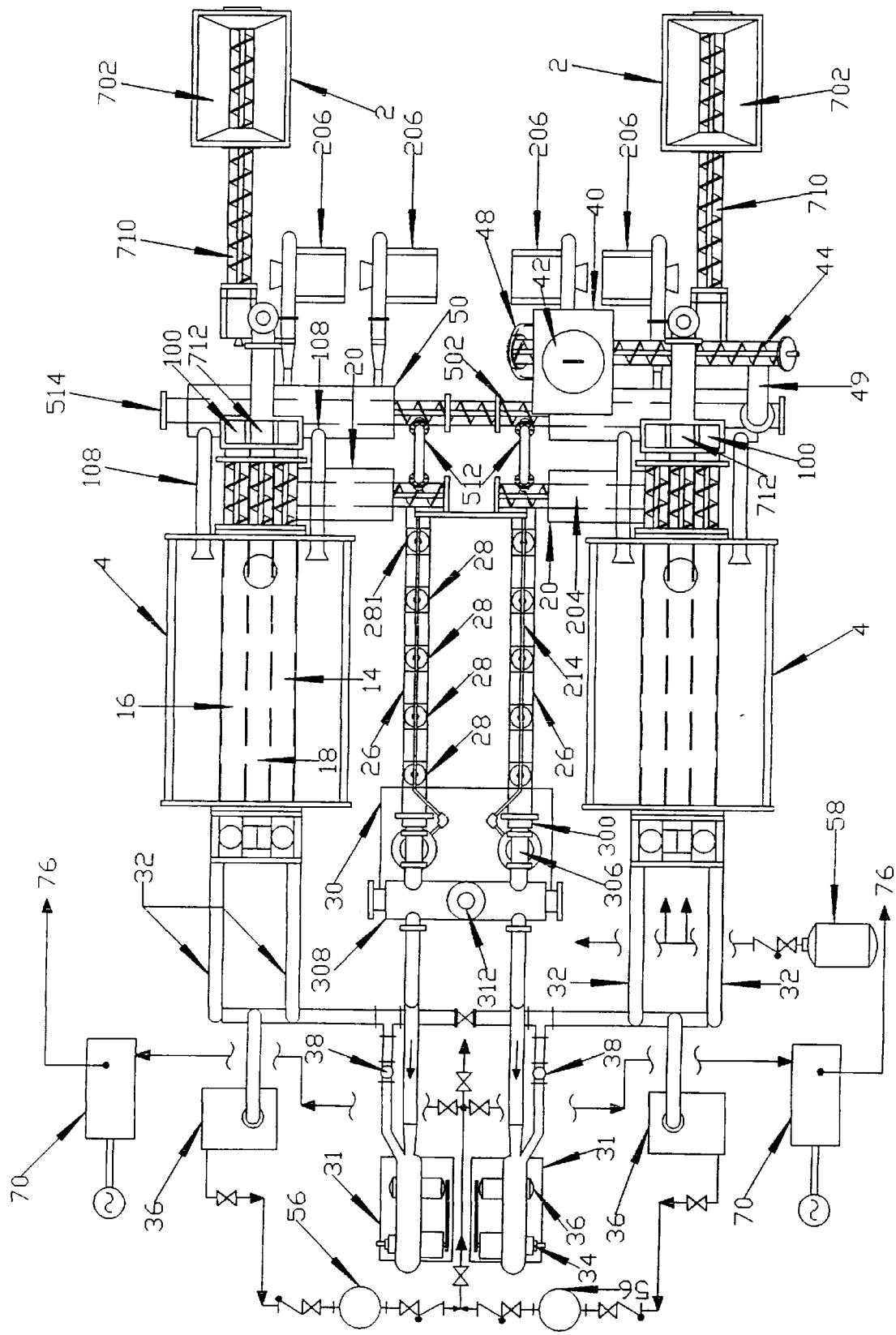
FIG. 2 is a plan view showing the components of an actual modular design for a typical pyrolysis plant system of this invention.

A plan view of a modular plant design is illustrated in FIG. 2. Details show augered conveyors, water spray nozzles 28 and other features. The relative size and location of various units or components is a preferred arrangement. The same interrelationships between apparatus and ancillary equipment of the actual plant exist as disclosed above. This nodular plant does not have a drying apparatus or a gas engine-generator although both of these units can be added within the confines of the plant shown. One of the most important features of the plant of this invention is the relatively small size and cost in comparison to conventional industrial or utility plants for processing waste and/or generating electrical power. The modular plant of this invention can be readily constructed and operated and avoids the environmental problems of conventional systems. Furthermore, the present plant can be incrementally expanded in capacity at separate and strategic sites due to its modular and comparatively compact design.

A flow diagram of the product stream for the different processes within another modular plant arrangement are illustrated in FIGS. 3A and 3B. The flow diagram shows four types of feedstock F1–F4 supplied to a receiving system 2 and a material processing system 3 to become a single feedstock. The plant is not limited to any number of feedstock materials and the possibility of more than one receiving system and material processing system exists and two receiving units are preferred. The material processing system 3 is not essential unless the feedstock requires further wetting, mixing, shredding and/or conveying. Depending on the amount of moisture in the feedstock and fluctuations in moisture content over time, at least a portion of the feedstock materials may need a predetermined amount of water removed or added. If moisture is to be removed at least a portion of the feedstock is elevated by a conveyor/elevator 704 to the drying apparatus retort 66. Moisture is removed by the drying apparatus 60 and the feedstock, at a predetermined moisture content, can be conveyed to the pyrolytic apparatus 4. Moisture can be added at the material processing system 3 from a makeup water supply system 52. The feedstock is supplied to the two upper retorts 14,16 of the pyrolytic apparatus 4. The two upper retorts discharge the feedstock into an interconnected lower retort 18 for further pyrolytic conversion into an intermediate activated carbon product and combustible gas product mixture. The modular pyrolytic apparatus 4 each have at least one and preferably two gas burners 22,24 to help provide the heat for pyrolytic conversion of the feedstream.

The hot intermediate mixture from the modular pyrolytic apparatus 4 of FIGS. 3A and 3B is conveyed through the optional jacketed conveyor 20. The jacket of the conveyor is provided to heat the ambient air of combustion (A) from an air blower 206 and piping 203 going to the pyrolysis burners 22,24. The intermediate products are thereafter conveyed through the spray water section 26 for further processing and cooling and to generate a carbon slurry and an enhanced gas mixture; the temperature of these products becoming greatly reduced by the spray water. The gas scrubber 30 receives the feedstream from the spray water section 26 to further scrub, cool, dry and separate the carbon slurry from the gas product.

Figure 5:
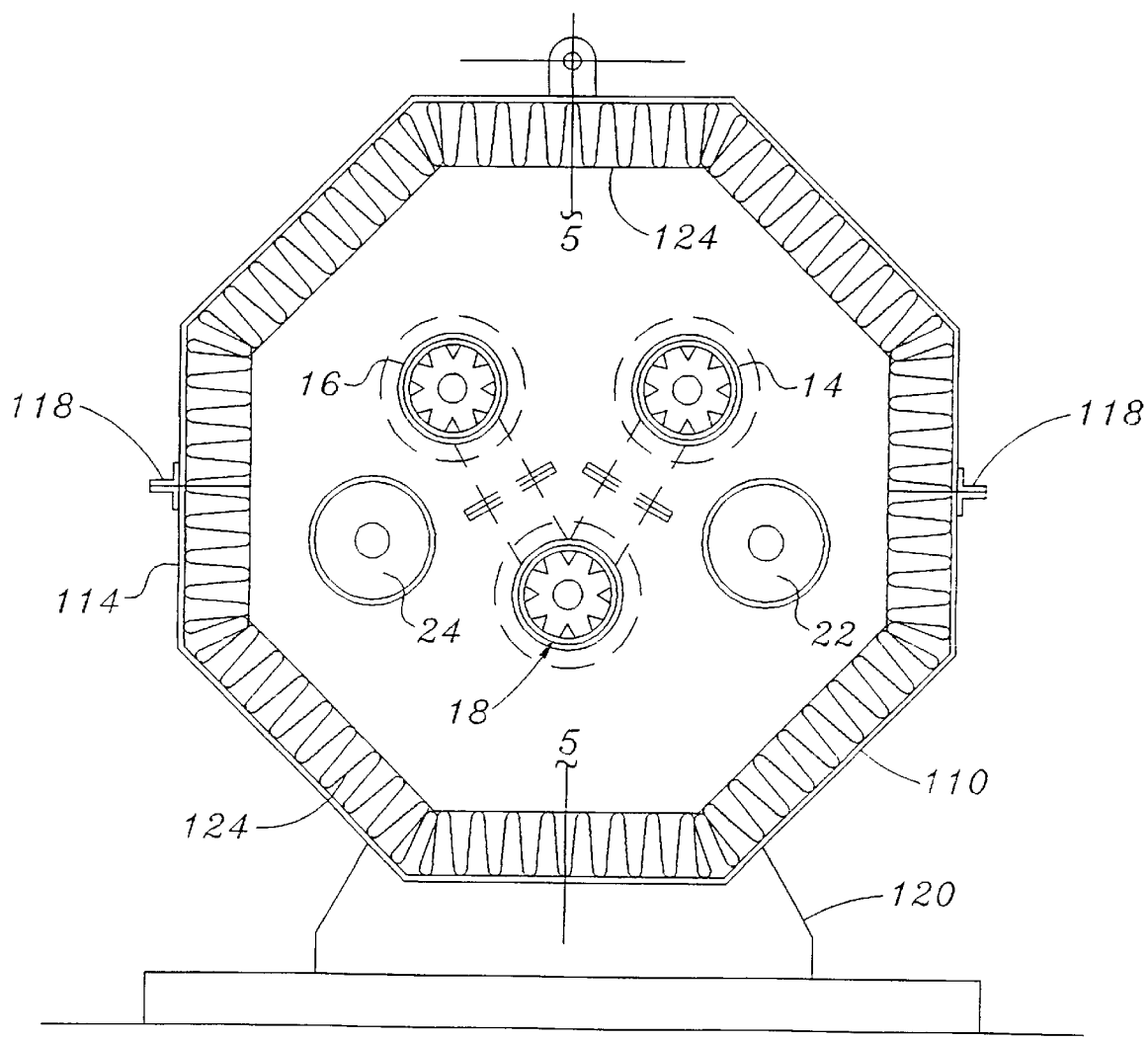
FIG. 5 is a cross-sectional view of an apparatus taken along line 5—5 as shown in FIG. 4.

The details of an apparatus which is a cavity radiator enclosing interconnected retorts which is operated to provide the essential process to at least pyrolyze feedstock is disclosed herein with reference to FIGS. 4 and 5. These illustrations show two sectional views of an arrangement of retorts in a cavity radiator 5 which function as a pyrolytic apparatus 4. Before addressing the technical aspects involved with the internal processes of the retorts in the pyrolytic apparatus, an explanation of the external configuration of the cavity radiator is in order. Although it may be circular, square, corrugated or other like shapes, it is preferred to be octagonal in cross-section for ease of fabrication and the efficiency in containment of insulation or a refractory lining. The cavity radiator can be insulated with or without a refractory type material. The insulation is preferred to serve as both the cavity radiator insulation as well as to provide an internal reflecting surface. The cavity radiator is designed for efficient radiant heat transfer and ease of fabrication, assembly, replacement, retrofit and maintenance. The complete pyrolytic apparatus may be easily rigged in and out of service by lifting lugs. The retorts may be disconnected and replaced.

The octagonal outer shell of the pyrolytic apparatus is structured in two upper and lower flanged sections. The complete octagonal shell assembly 110 may be removed from a base support 120 for replacement and servicing. The octagonal assembly 110 may be taken apart at the two assembly flanges 118. Removal of an upper assembly 112 permits servicing of the three retorts 14,16,18 when the lower assembly 114 and two end plates 116 remain in place on the base support 120. The two end plates, attached to the octagonal assembly by any appropriate means, are also made in sections so that any one of the retorts may be removed from the octagonal assembly without removal of the upper assembly 112 or disturbing the other two retorts. The material used for the octagonal assembly 110 as well as the end plates 116 may be type 304 stainless steel and all plate sections are welded to be gas tight. An exterior flue connection 122 may be provided on the upper assembly 112 or in either end plate.

Figure 6:
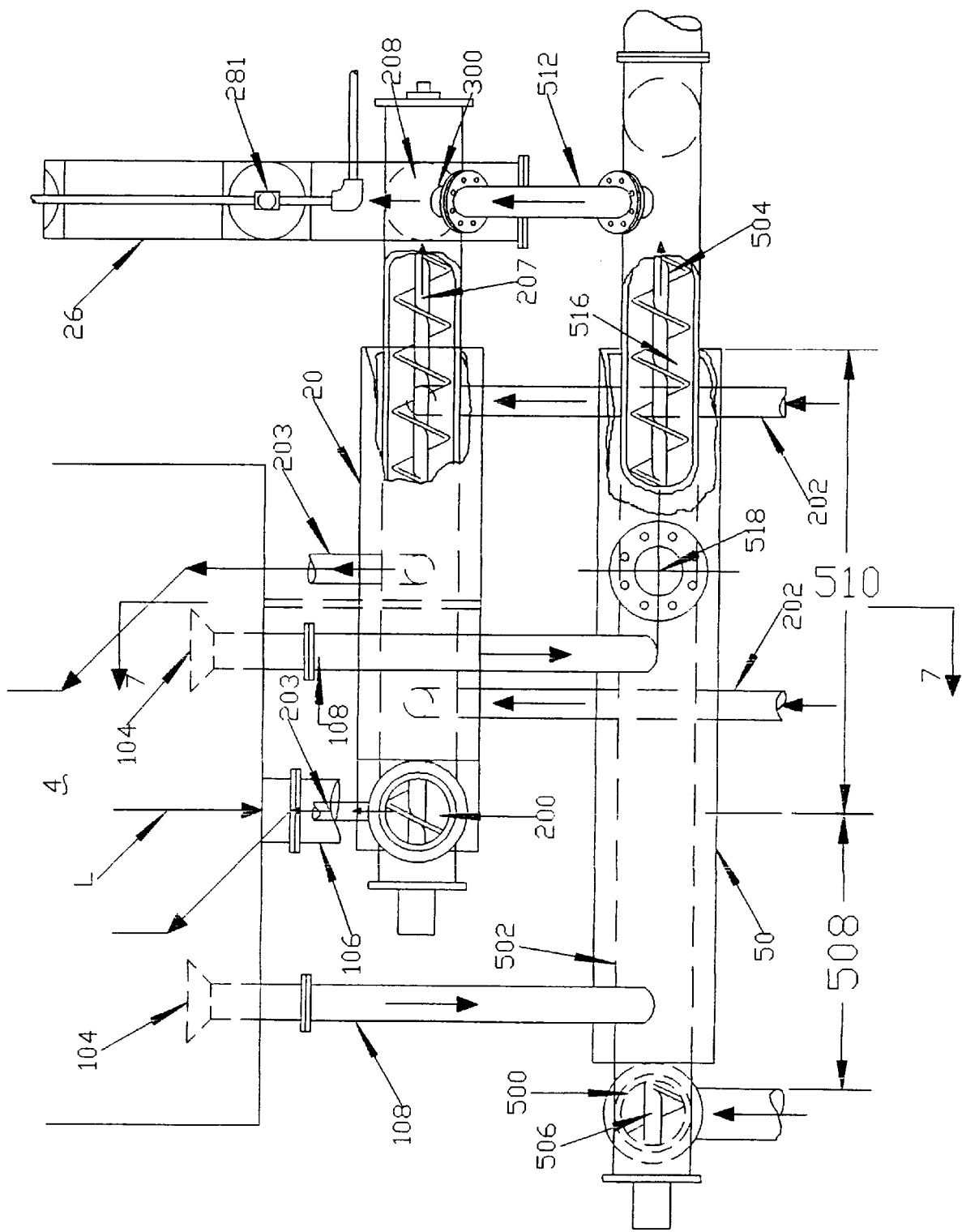
FIG. 6 is a plan view of a jacketed conveyor section and regenerating apparatus of this invention.

It is important that the predetermined cavity radiator volume 5 be provided to allow the proper heat transfer to every square inch of the retorts. The octagonal assembly 110 is positioned such that the three retorts are located an equal distance from each one of the other retorts. The orientation of the retorts relative to each other may form an equilateral triangle, a square or other geometric arrangement centered around a longitudinal axis L—L of the cavity radiator (FIG. 6). This orientation permits an optimum exposure of the retorts such as retorts 14,16,18 to the radiant energy environment within the cavity radiator 5. The two pyrolytic burners 22, 24 are so positioned to create this optimum radiant environment. Burner units that provide the correct environment are known in the industry. A typical burner is the Kinemax (R) manufactured by Maxon Corporation of Muncie, Ind.

The retorts with their specially designed augers are made of a high temperature alloy. The retorts are designed to be resistant in a sulfurous, carbonizing and chlorine rich environment. The exterior surfaces of the tubular portion of each of the retorts is increased in texture and roughness during fabrication to allow the retort to more effectively function as a black body. All surfaces of the octagonal cavity radiator 110 and the end plates 116 are completely insulated with a high temperature resistant insulation 124. For example, a 6 inch thick 12 pound density insulation with a blanket backup can be used; typical of Inswool (R) manufactured by A. P. Green of Mexico, Mo. It is preferred that the insulation is secured to the inside face of all surfaces by mechanical anchors 126 typical in the industry, however, the insulation may also be secured to the outside face. It is essential to the operation of the apparatus of this invention to adhere to the structural configuration herein described for proper heat transfer to the feedstock in the retorts. However, although less preferred, the total modular system of the present invention can be operated with other known steady state pyrolytic reactors such as, for example, that taught by U.S. Pat. No. 4,705,603 to McMullen, et al. Similarly, a single, extended retort is within the scope of the present invention although the apparatus most preferably has interconnected retorts of the configuration shown in FIGS. 4 and 5. Shown in such figures is the preferred embodiment of two upper retorts feeding into a single lower retorts. A reduction in retort volume during pyrolysis is preferred because of the sequential reduction of solid mass and simplicity of configuration. However, any number of upper retorts feeding into a lesser number, the same or a greater number of other retorts would also be encompassed by the invention.

Alternatively, a configuration of retorts to maintain or increase retort volume during or after pyrolysis may be preferred to cause a decrease in the rate of flow of the gases and thereby, an increase in gas residence time. Such configuration would further serve to provide a separation of the intermediate gas and solid products during pyrolysis. Although the chemistry of pyrolysis will be discussed at least briefly below it should be noted here that such separation of products can alter the relative fraction of hydrogen gas in the total gas product mixture and will promote cracking of higher chain hydrocarbons. Finally, depending on the specific end products desired, a configuration of a single central retort and auger feeding into a lower retort and auger leading to an outlet port for the solid product and feeding into an upper retort and auger leading to an outlet port for the gas may be preferred for certain feedstreams.

For purposes of the present invention it has been found that an extended residence time for the gas product or the activated carbon product within the pyrolytic apparatus is, in most cases, preferred. Unlike other prior art pyrolysis systems discussed above, the present system is primarily concerned with the provision of a combustible gas mixture of carbon monoxide, hydrogen and lower chain hydrocarbons.

Under proper temperature and turbulence conditions an extended residence time allows for the cracking of higher chain hydrocarbons. For present purposes "lower chain hydrocarbons" may be defined as those of four carbon atoms or less, preferably of two carbon atoms or less. Most preferably, methane and a minor amount of ethane are the predominate hydrocarbons produced. "Higher chain hydrocarbons" may be considered those having five or more carbon atoms per molecule. It should be noted that if oils, tars, liquors, waxes, graphites, special carbons such as fullerenes or other higher grade carbon products are desired the operating conditions or parameters of the present system may be adjusted to provide such. However, the simplicity of this system is best suited for the processing of activated carbon and combustible gas products only.

Thus, preferred operating conditions include a pyrolysis temperature of 700 to 2200 F., preferably from 1650 to 1950 F. and most preferably from 1750 to 1850 F., depending, of course, on the composition of the products desired from a selected feedstream. Considerations include composition, particle size, moisture content of the feedstream and, most importantly, the quality and quantity of desired product. It is preferred that the feedstream have a moisture content of 10% to 30%, preferably 15% to 25%. Thus, feedstreams having moisture contents greater than about 40% may be altered by mixing in, for example, about 70% of a less moist material of choice such as, for example, a drier form of the same feedstream or a fraction of its own dry carbon product from the process. Such additives serve to texturize, control odor and reduce the mean moisture content of the feedstream. Alternatively, feedstreams having such high moisture content may be first directed to drying apparatus 60 prior to entering the pyrolytic apparatus 4. Feedstreams having moisture contents less than desired, such as shredded tires, may be moistened by combining with a high moisture feedstream such as wastewater sludge, or may be sprayed with water or condensate from the system as is noted below. Feedstreams having a moisture content greater than the preferred range may be pyrolyzed by pyrolytic apparatus 4 so long as temperature or residence time or both are increased accordingly. Preferred residence time for most feedstreams is 2 min to 4 min. although, of course, high moisture content feedstreams require relatively longer residence times and residence time must be increased if temperature is decreased. That is, a change in temperature, feedstock composition or any other operating parameter of the system will alter the composition, quantity and quality of the desired end products.

Turbulence is also important as an operating parameter within the present pyrolytic apparatus. As is shown in FIG. 4, notches defined within flight 102 of the augers 6,8,10 are preferred for increasing turbulence within the retorts. Further, the present system does not rely on elevated pressures or catalysts for effective pyrolysis, although in less preferred embodiments either or both may be employed for faster processing. However, once again, the simplicity of the present system is specifically designed to produce valued products including an activated carbon and a clean, diluted hydrogen fuel (gas) for continuous support of an engine-generator without necessarily using catalysts, pressure seals, pressurized steam or pressurized purging agents. The operation of the present system at ambient pressures, in addition to simplifying the overall design, is an especially important safety feature given the high pyrolysis temperatures involved.

The apparatus and process of the present invention may be completely automated. Time, temperature, turbulence, moisture content, feedstock composition, through-put rate, products composition, weight, displacement of air and other operating parameters effecting the quantity and quality of the desired products may be instrumented, automatically controlled and monitored and programmed by one or two personnel at a control console. A DCS/PLC (Distributed Control System ard Programmable Logic Control) system, also known as "ADACS" or Advanced Process Automation and Control System, with input and output modules, hardware and software integration and power supply modules provided by Moore Products Co., Spring House, Pa. is preferred among the manufacturers in the industry.

The chemistry of pyrolysis may be examined by theory which has been corroborated by empirical data; however, the present general observations should be noted to be hypothetical and not limitative of the present invention. Generally, flash pyrolysis is comprised of a series of chemical reactions which are, over all, endothermic in nature. The feedstream, in plug flow, enters the upper retorts at inlet ports 100 (FIG. 4). Initially, the feedstream, which may have a temperature as high as about 212 F. if it has passed through drying apparatus 60, serves to cool the initial retort and flight section as it is simultaneously heated by conduction and radiant energy to 212 F. Moisture content of the feedstream is preferably controlled so steam is formed and acts as an interface additionally, or in place of a full hopper or plug flow of the feedstream, displacing air from entering that section of the retorts, effectively at atmospheric pressure separating evolved gases within the process closed-end system from air and surroundings outside of the system. Thus, steam and then superheated steam are formed as the mass of the feedstream continues to increase in temperature.

As the temperature increase continues the various components of the feedstream are dissociated into a residual carbon matrix and sublimated gases. The apparatus is designed to create and maintain the pyrolytic retorts red hot by predominant radiant heat in the form of infrared radiation. For present purposes "infrared radiation" may be defined as a form of electromagnetic energy within the infrared and microwave portion of the electromagnetic spectrum having a wavelength in the range of 0.75 micrometer to 1,000 micrometers.

Carbohydrate components, such as cellulose, produce compounds of oxygen as well as hydrocarbons upon being augered into the infrared zone. The radiant retort and auger then perform as a glow plug to ignite at least one exothermic reaction which releases heat directly within the retort, rather than heat and energy being indirectly transferred through that retort wall from the burner flame and thereby also efficiently supports the overall endothermic process. At approximately 900 F. the ignition of carbon and oxygen by the retort to form carbon oxides is one example:

$$3C + 2O_2 \rightarrow 2CO + CO_2$$

with the oxygen in the above reaction being most probably supplied by carbohydrate (cellulose) dissociation.

Having so combined available oxygen with carbon previously avoids ignition at approximately 1300 F. of available hydrogen with oxygen further into the retort. Further passage of the masses through the radiant retorts causes dissociation of components at various temperatures and, similarly, cracking of various higher chain hydrocarbons at various higher temperatures. At temperatures above about 1600 F. certain endothermic reactions occur such as the water gas reaction which reduces the mass of the solid carbon product, increases the degree of activation (porosity and surface area) of that product, promotes fixation (surface bonding) of metals, sulfur, halogens and other substances with that product and increases the mole percent of the gaseous hydrogen product. The following are examples of theoretical overall reaction mechanisms:

$$C+H_2O \rightarrow CO+H_2$$

$$2C+3H_2O \rightarrow CO+CO_2+3H_2$$

$$2CH_4+3H_2O \rightarrow CO_2+CO+7H_2$$

$$CH_4+2H_2O \rightarrow CO_2+4H_2$$

$$CH_4+H_2O \rightarrow CO+3H_2$$

Thereby an increased amount of gaseous hydrogen product is produced from reformed steam by control of the pyrolyzing retorts, control of the feedstream moisture content and control of ignition of combustion with oxygen until the processed end product gas is deliberately utilized in the presence of air as a fuel. Therefore, this is at least one way the present system is designed to produce a greater amount of heating value (amount of BTU) per unit amount of the same feedstream compared to a conventional combustion process (direct oxidation), such as performed by a bomb calorimeter.

That is, in a bomb calorimeter or other type of combustor such as a boiler or an incinerator, any water content of a sample of a feedstream takes away from the overall heating value because of the energy lost to heat the water. In the present process at least a portion of the feedstream moisture content is reformed to displace hydrogen in the absence of reactions with free oxygen to more simply, safely, efficiently and economically produce a formulated amount of hydrogen adding to the other combustible gas components produced by dissociation, combination and cracking of that feedstream solids to yield the total end product combustible gas of the present invention. That gas is distinct and detectable by laboratory analysis of major components. Typical of water gas, and unlike natural gas, conventionally generated producer gas and coal gas or other synthetic gas products of partial pyrolysis processes, the pure pyrolysis gas product of the present invention can have from about 50 mole percent to about 75 mole percent or higher of hydrogen. Concomitantly, a greater mass and heating value for a given feedstock is produced.

Figure 7:
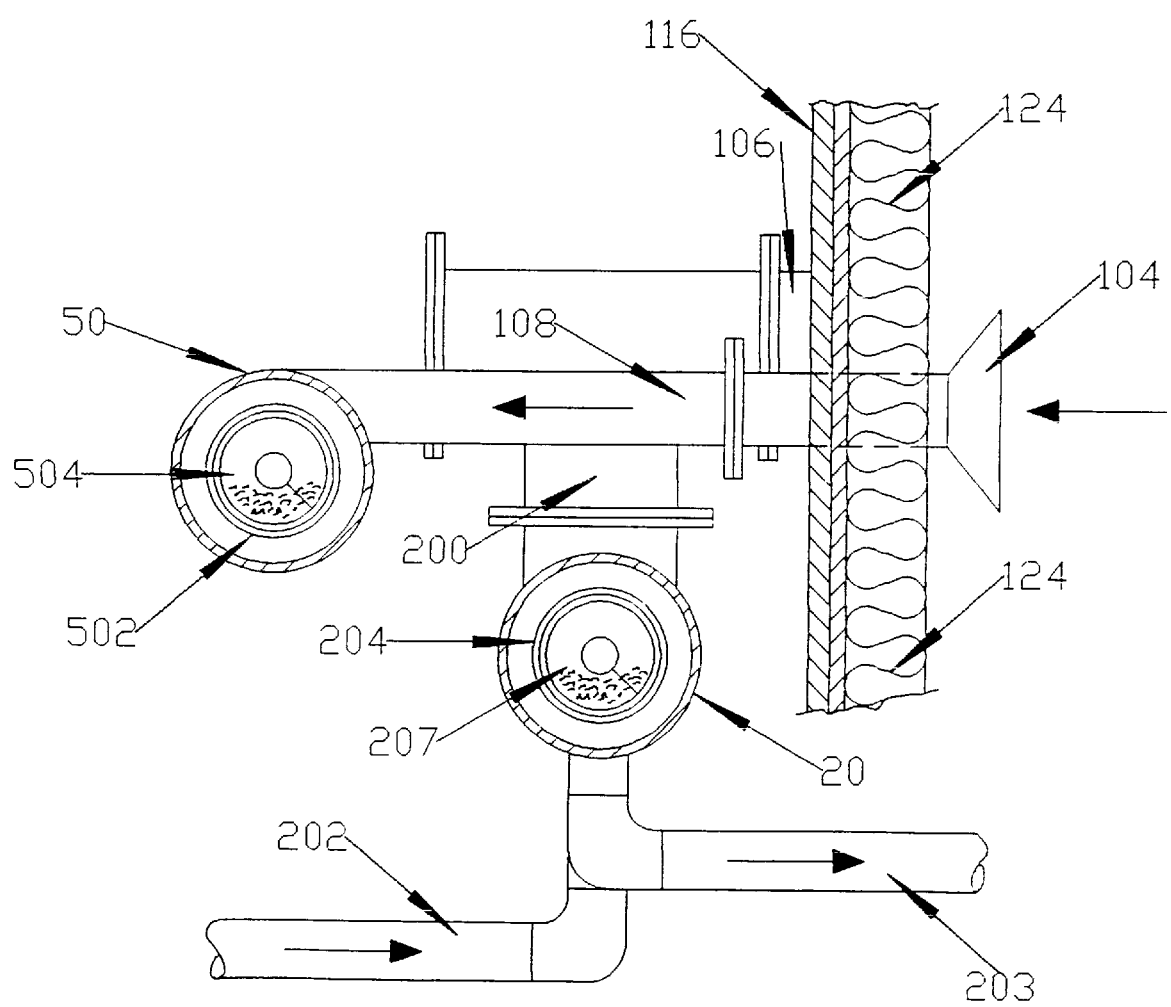
FIG. 7 is a cross-sectional view of a jacketed conveyor section and regenerating apparatus taken along line 7—7 as shown in FIG. 6.

Following flash pyrolysis within the pyrolytic apparatus the activated carbon and gases formed therein, which are actually intermediate solid and gas products, are conveyed through jacketed conveyor 20 to spray water section unit 26. The jacketed conveyor 20 may be a section of a pyrolytic retort exiting the cavity conveyor, or positioned below the end outlet port 106 of the lower retort 18 as illustrated in FIGS. 4, 6 and 7. The intermediate mixture enters the conveyor inlet port 200 and is transported by the jacketed conveyor auger system 207. The auger has standard flights of equal pitch to transport the feedstream to the spray water section 26. The intermediate mixture enters the spray water section inlet port 208 and proceeds toward the first spray water nozzle 281 for further processing. A jacket 204 surrounds a portion of the jacketed conveyor 20. In addition to transporting the intermediate products to the spray water section, the jacketed conveyor also serves as an air preheater. Specifically, the jacket is to receive ambient air from the blowers 206 (FIG. 2) by way of the ambient air duct piping 202. The air is heated in the jacket to provide preheated air for the convertor burners 22,24 by way of the hot combustion air duct piping 203. Thus, a heat transfer occurs which preheats the combustion air for the burners and which cools the intermediate products from a temperature of as high as about 2200 F. exiting the convertor to less than at least 1900 F. on entering the spray water section. For maximum system efficiency the intermediate products are cooled to from about 1000 to about 1500 F. in the jacketed conveyor/air preheater. The combustion air from the burners within the pyrolytic apparatus is discharged through an exhaust port 104 by exhaust lines 108 to a regenerating apparatus 50, for example. The regenerating apparatus 50 is discussed in more detail later in this disclosure.

Alternatively, the intermediate products exiting the pyrolytic apparatus at outlet port 106 may be directed immediately to the spray water section with little or no cooling. It has been found allowing for the heat exchange in the jacketed conveyor discussed above which reduces the temperature of the intermediate products does not have a significant deleterious effect on the reactions occurring within the spray water section but, rather, reduces the demand for spray water and greatly enhances the thermal efficiency of burners 22, 24. Thus, cooling of the intermediate products within the jacketed conveyor is a preferred, albeit a nonessential element of the present invention.

Figure 8:
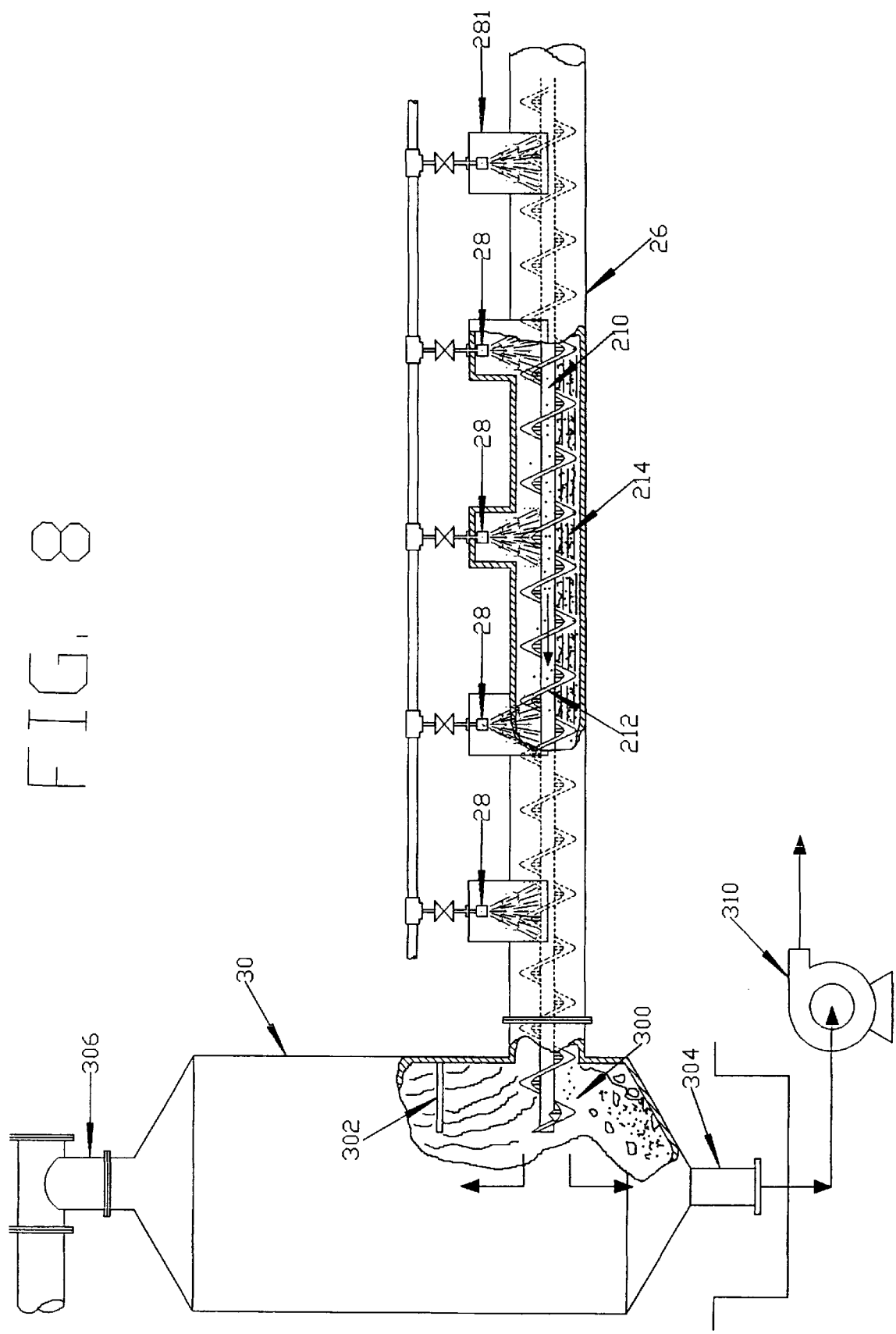
FIG. 8 is an elevation view of the spray-water section and gas scrubber apparatus of this invention.

An elevation view of the spray water section 26 and the gas scrubber 30 is shown in FIG. 8. Further details of these two units are given to better describe their essential functions. Coming into the upstream side of the spray water section 26 are the intermediate products received from the retorts of the pyrolytic apparatus and recovered gas products from the regenerating retort gas outlet pipe 512. Intermediate products from the jacketed conveyor 20 include solid carbon products and a gas mixture having a temperature of at least 1000 F., as discussed above. Also, a lesser mass of regenerated gas products from regenerating apparatus 50, discussed below, are directed to the spray water section. Such lesser volume of gas may have a temperature as high as about 1600 F. to about 1850 F. depending on the operating parameters of the regenerating apparatus. Spray water nozzles are positioned along the length of the spray water section to process and scrub these gases and the activated carbon product.

Looking further to the spray water section in FIGS. 6 and 8, the auger 212 within the conveyor enclosure 214 has a ribboned flight 210 for nonrestrictive flow. Intermediate products entering the spray water section at inlet port 208 have a temperature of at least 1000 degrees Fahrenheit. Thus water sprayed onto the products through at least the first nozzle 281 is immediately converted to superheated steam. This steam formation furthers the water gas shift reaction. Such cooling is regulated by control of droplet size and spray rate. Subsequent water sprays serve to contract and cool the gas masses further and to prevent significant production of carbon dioxide and hydrogen. That is, the exothermic water gas shift is retarded or promoted by controlling spray rate at approximately 800 F. by respectively cooling or maintaining temperature. Such reaction is generally:

$$CO+H_2O \; CO_2+H_2+\text{exothermic}$$

The last water sprays are designed to further contract the gas volume and cool the products, condense steam, tars, oils liquors, any vaporized metals not previously fixated, and other condensible components of the gas mixture, and provide a mist to absorb carbon dioxide and scrub particulate such that the created carbon slurry and gases enter the gas scrubber 30 below about 212 F.

A catalyst (i.e. nickel) may be used to increase the production of hydrogen although such is not preferred.

Feedstream flow within the spray water section is a result primarily of gas expansion from the early formation of steam but such flow may be further assisted by the inducement of a gas blower unit 34 downstream of the gas scrubber (FIG. 1A). Pressure of the gas mixture is controlled to be near atmospheric; within +/−5 pounds per square inch.

The feedstream in the spray water section 26 of FIG. 8 is conveyed, reacted, enriched, scrubbed, cooled, condensed, and quenched before entering the plate tower gas scrubber unit 30 at the scrubber inlet port 300. There are fewer molecules and less mass of gas entering the gas scrubber than once existed in the intermediate mixture or the gaseous products present in the spray water section as a result of condensation and scrubbing or particulates and the spray water adsorption of gases such as carbon dioxide.

Upon exiting the spray water section the carbon slurry and gas mixture are routed immediately into a gas scrubber unit where the two products are separated. The carbon slurry is drained through a lower outlet port and is directed to a dewatering assembly, discussed in greater details below. The gas mixture preferably passes upwardly through a tortuous path of plates which cools and dries the gas and removes any remaining higher chain hydrocarbons including any tars, oils and particulate.

After exiting the gas scrubber at least a portion of the gas mixture is directed to storage. One or more filters may be provided in the lines leading away from the gas scrubber to further reduce the concentration of unwanted components. These filters may be periodically changed with the used filters being shredded and reintroduced into the system as a portion of the raw feedstream.

It is most preferred that at least a portion of the gas mixture is directed to burners 24 and 26 within the pyrolytic apparatus. Although it is possible to operate the present system relying completely on an outside fuel source, it is an advantageous feature of the present invention that it is self-sustaining. The percent of fuel produced required to operate the system will vary by raw feedstream composition and moisture content. An example is 13% of the combustible gas mixture produced is sufficient to operate the system when a raw feedstream of refuse derived fuel (RDF) having a percent moisture content of 20% to 28% is being processed.

Moisture content is relevant not only to the number of BTUs required to heat the pyrolytic apparatus to flash pyrolysis temperatures but also to the use of the drying apparatus. If duct burner 78 is used to heat drying apparatus 60 (FIG. 1B) then it is preferred that the combustible gas mixture (1) produced by the system serve to fuel that burner, although, as, noted below, drying apparatus 60 may be heated merely by the exhaust (E) vented thereto from the pyrolytic apparatus, exhaust (3) from the regenerating apparatus 50 or the gas engine-generator 70 exhaust (2).

Upon exiting the gas scrubber the gas mixture is composed primarily of carbon monoxide, hydrogen, lower hydrocarbons and carbon dioxide. Carbon monoxide, hydrogen and lower hydrocarbons make up most of the product combustible gas of thus present invention. Carbon dioxide, however, is not a combustible gas although its presence does not deleteriously effect the combustibility of the other gases and, in fact, serves to dilute the hydrogen which may otherwise cause preignition in the gas engine-generator. As noted above, the relative percent of carbon dioxide, carbon monoxide and hydrogen in the gas mixture is controlled by regulating temperature and spray water to absorb carbon dioxide and to retard or promote the water gas shift reaction. The control and addition of hydrogen from water to achieve an optimum or relatively high percent in the combustible gas product is a distinctive feature of the present invention.

Figure 9:
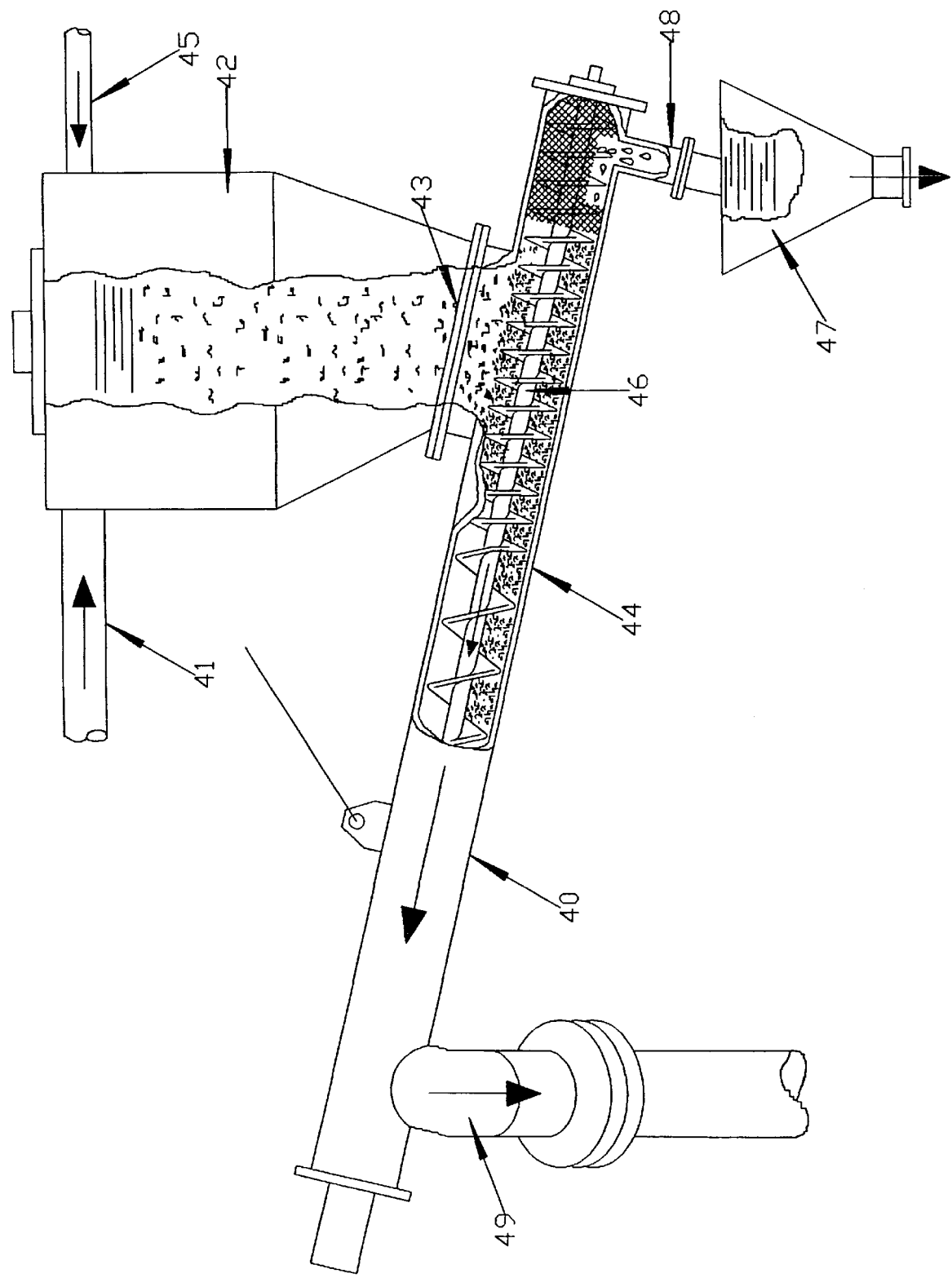
FIG. 9 is an elevation view of the dewatering assembly of this invention.

Returning to the dewatering assembly 40 which receives the carbon slurry from the gas scrubber, such system is best depicted in FIG. 9 of the present drawings. The carbon slurry flows through the lower outlet port 304 and may be optionally transported to a carbon filter column prior to the dewatering assembly or preferably is transported directly to the dewatering assembly 40 (FIG. 9) by the carbon slurry pump 310. Drain bin 42 is a closed hopper to receive the carbon slurry at an inlet port 41 from the gas scrubber 30 by way of the carbon slurry pump 310. The drain bin acts as a condenser for steam from the drying apparatus and settles the solids out of the slurry, whereby it acts as its own activated carbon filter and separates the carbon slurry in a closed inclined conveyor 44 at the drain bin outlet 43. The auger 46 has single flights with a closer pitch in the lower section near the drain bin outlet 43 than along the upper sections of the auger. Water separates from the activated carbon product due to gravity and filtration and flows to a screened filtrate drain port 48 and into a filtrate tank 47 at the lower end of the inclined conveyor. Water drained from the dewatering assembly 40 is recirculated to the spray water section 26 and to the gas scrubber 30 (FIG. 3). The recycled water can also be used in the material processing unit 3 if these optional components exist and require a supply of water. Generally speaking, the filtrate can be a potable water that can be utilized as needed. The dewatered activated carbon is conveyed up the inclined conveyor 44 to the upper exit port 49 as a wet carbon product. From this exit port the wet, activated carbon is conveyed directly to the regenerating apparatus 50; or to the drying apparatus 60 for further reduction to an optimum moisture content prior to being regenerated and reactivated within the regenerating retorts.

As noted above, in the spray water section the recirculating water of the present system absorbs some of the carbon dioxide present in the gas product. To prevent a saturation of the system water with carbon dioxide a means for removing such from the gas product may optionally be provided. One preferred method for removing carbon dioxide is treatment of gas product with the activated carbon product or, optionally, the use of a substance such as monoethanolamine which may be used and regenerated after the gas scrubber.

Under most operating conditions and for most raw feedstream compositions, the water employed in the present system is continuously recycled such that no outside make-up water is required and no excess water is created. However, for low moisture content feedstreams outside make-up water may be imported into the system and for high moisture content feedstreams excess water may be exported. Although it should be noted that any excess water created by the present system has been condensed and filtered through the activated carbon product in the dewatering assembly. At this point in the system the reactivated carbon end-product from the regenerating apparatus is sufficiently activated to render the water potable.

As previously noted, the activated carbon which has now been at least partially dried by the dewatering assembly 40 may be optionally routed to drying assembly 60 and then to regenerating apparatus 50 or may be routed directly to the regenerating apparatus as is shown in FIG. 1A. The considerations involved in any decision to dry or not dry the wet activated carbon prior to introduction into the regenerating apparatus are best understood by an examination of the purpose of function of the regenerating apparatus.

In one aspect the regenerating apparatus 50 may be considered as providing a second flash pyrolysis step. The moist activated carbon enters one end of a regenerating apparatus retort at inlet port 500 as shown in FIG. 6. The activated carbon product is conveyed by an auger 516 as it is further dried, pyrolyzed and reactivated. Regenerating apparatus cavity radiator 502 may be a jacket portion receiving the exhaust gases from one of the pyrolytic apparatus 4 supplied by the exhaust lines 108 as also shown in FIG. 7. Such exhaust has a temperature ranging from about 1500 F. to about 1800 F., sufficient for flash pyrolysis to regenerate a sufficiently dried carbon mass. That is, if the activated carbon has a moisture content above about 25% then the moist carbon entering the regenerating apparatus significantly cools at least a first section of the retort and auger. Thus, a heat exchange occurs with a significant amount of energy being used for drying the activated carbon and producing steam and other gases. The pyrolysis which occurs with such heat exchange may not be flash pyrolysis if the temperature within the retort is significantly reduced.

If, however, the wet activated carbon is first routed through the drying apparatus, it enters the regenerating apparatus with a lower moisture content and is preheated. The high temperature exhaust gas being routed from the pyrolytic apparatus to the regenerating apparatus cavity radiators 502,503 is then sufficient to heat the regenerating apparatus and the preheated carbon to within flash pyrolysis temperatures. If a highly activated carbon end product is desired it can be achieved at higher temperatures by a burner in the regenerating apparatus cavity radiator. One circumstance under which such a product would be desirable, if not necessary, is, for example, the processing of a hazardous waste feedstream by the present system. The more highly enhanced and activated the carbon product, the better it fixates hazardous components of such as halogens, heavy metals and sulfur. Such fixation is considered to occur by chemical bonding between the substances and the solid carbon surface.

Thus, the optional regenerating apparatus 50 may be controlled with a burner to provide an additional pyrolyzing, reactivating and fixating step. As such, any entrained hydrocarbons adsorbed in the carbon after leaving the pyrolytic apparatus and the spray water section are now regenerated as gases which may reform to produce further carbon monoxide, hydrogen and carbon dioxide.

The auger 506,516 transports the activated carbon product as it is heated, dried and pyrolyzed again to generate more gaseous products and steam. The gaseous products and steam are transferred back to the spray water section 26 by gas outlet pipes 512. The dried and activated carbon product is further transported in the regenerating apparatus 50 by the regenerating auger 516 and is discharged from the regenerating apparatus 50 through a rotary valve 515 at a carbon outlet port 514. An alternate modular design is to have two separate regenerating apparatus. Each would have an inlet port to receive a portion of the moist activated carbon product from the dewatering assembly and/or a drying apparatus. The two regenerating apparatus may transport the activated carbon product in opposite directions to a common outlet port in the center of the plant. The advantage of having two regenerating units is that the plant becomes more symmetrical. Therefore, optimum operating conditions can be easily achieved by varying operating conditions within one half of the plant and comparing the output with the other half of the plant. However, the preferred plant is one with a single relatively long regenerating apparatus 50 which can increase the residence time in processing the activated carbon product into a more highly activated carbon and achieve a greater amount of fixation.

The simplified system illustrated in FIG. 1C can be achieved if a controlled organic feedstock with en optimum moisture content is being processed. The object is to have only the "bare essentials" of a simplified plant system to meet the needs of the owner and operator. Such a plant system is best utilized when a single homogeneous feedstock is being processed. The pyrolytic apparatus has an input of combustion air from without the closed end system and a combustible gas from within or without the closed end system to the pyrolytic burners. The combustible gas may also be generated in another pyrolytic apparatus of the system. Outputs from the pyrolytic apparatus are exhaust gases from the burner within the cavity radiator and the intermediate solid carbon and gas products mixture from within the retorts. The essential spray water section 26 receives the intermediate mixture as well as water for the spray nozzles. Process gases may also be another input to the spray water section if the optional regenerating apparatus 50, or in one case the drying apparatus 60, is used. An enhanced intermediate mixture is discharged from the spray water section, as a carbon slurry plus an enhanced gas mixture, to the gas scrubber 30. The gas scrubber may be quite simple as, for example, only a tee connection at the end of the spray water section to help separate the slurry from the gas. A more complex gas separator would use water to help separate and further scrub the enhanced gas mixture. It is preferred that the water comes only from control of the moisture content of the feedstock entering the closed-end system. One output from the gas scrubber is one of the final products; a clean, combustible gas mixture for public consumption. A fraction of the clean combustible gas mixture to fuel the process is another product. The carbon slurry output of the gas scrubber is a third product preferably directed for further processing. The carbon slurry is the input to the dewatering assembly inlet port 41 from gas scrubber outlet port 304 and through pump 310 (FIG. 8). The dewatering assembly separates the water from the carbon slurry leaving a wet activated carbon. This may be all that is required of the simple system if wet activated carbon containing adsorbed substances is desired. However, the preferred system would further process the wet activated carbon to enhance its value as a marketable product.

The condensed and filtered water, being an output from the dewatering assembly 40, is used for both the spray water section 26 and the gas separator 30. The dewatered but wet activated carbon can be an input to the optional drying apparatus or to the optional regenerating apparatus 50 or both for further processing; along with the exhaust from the pyrolytic apparatus or the regenerating apparatus.

Predetermined conditions or specifications on the wet activated carbon will determine if regeneration is desired. If further moisture must be removed from the dewatered carbon before further processing in the regenerating apparatus, at least a portion of the dewatered carbon is used as an input to the drying apparatus 60. A preferred limit of about 30 percent moisture in the wet activated carbon is allowable before the optional drying apparatus is necessary. The dewatered, moist carbon output from the drying apparatus becomes another input to the regenerating apparatus 50 for additional processing. The drying apparatus 60 may also have the combustible gas and ambient air as inputs for a dryer burner, although such a burner is not preferred. The optional regenerating apparatus 50 outputs the other final product, being a more highly activated carbon product for public consumption. The gas for any burner used in the system is the combustible gas product under continuous operating conditions. Initial start-up gas is externally provided, but once the system is operational it converts a moist organic feedstock as the single source of fuel. The balance of feedstock moisture with process water demand can be achieved with no make-up water required or water discharged by controlling the moisture content of the feedstock. However, the discharged water can be safe potable water if operational conditions resulted in excess water.

The steam from the drying apparatus is an input to the dewatering assembly condensing section of the drain bin where it condenses into the carbon slurry. The combustible gas is of such high quality that no air pollution is anticipated from any exhaust using this combustible gas mixture. Therefore, the feedstock has preferably been completely and efficiently converted to enhanced products with no environmental damage.

Another operational condition for the simplified system of FIG. 10 exists when the optional regenerating apparatus is not necessary, although preferred, and the wet carbon needs additional moisture removed. In this case the optional drying apparatus is required. One alternate source of heat for the dryer's cavity radiator becomes the exhaust from the pyrolytic apparatus 4. Steam from drying the wet activated carbon is again returned to the condensing section of the drain bin 42 by steam inlet 45 of the dewatering assembly. A sufficiently dried but moist activated carbon is produced for further processing or used in its present condition. The drying apparatus is not operated at the high temperatures typical of those used in the regenerating apparatus. The difference being to only vaporize a portion of the water in the wet carbon and not to further pyrolyze the wet carbon adsorbent, but preheat it prior to further thermal processing in the regenerating apparatus. However, these two units and the pyrolytic apparatus can be structurally the same, as discussed above.

An important embodiment of this invention is the integrity of the pyrolytic conversion as comprising a "closed-end system" as a sub-system of the complete process. For further discussion purposes a closed-end system may mean the assembly of apparatus and interconnected process equipment or sub-units having a gas-tight volume for the transfer of feedstock being processed. Specifically, it is that sub-system of this invention beginning with an essential part being an inlet hopper which displaces air from moist organic material by creating a plug flow with the feedstock. Feedstock enters into either inlet port 100 of the retorts 14,16 of the pyrolytic apparatus 4, inlet ports of the dryer retorts 66 of the optional drying apparatus 60 or first into a conveyor elevator 704 which connects to either of the other two inlet ports. Feedstock is contained, conveyed, dried, converted, reacted, cooled, condensed, scrubbed, separated, dewatered, filtered, stored, controlled and metered within the closed-end system. These sequential operations continue until (1) a combustible gas mass is directed to be mixed with combustion air for use outside the closed-end system and (2) an activated carbon mass is discharged and placed in contact with ambient air for use outside the closed-end system through a carbon outlet port device, such as a rotary valve 515. The heating chambers of the pyrolytic apparatus 4, the drying apparatus 60 and the regenerating apparatus 50 are a part of a second sub-system, being outside the closed-end system, and are referred to herein as cavity radiators. Burner flame envelopes and exhaust gases are also outside the closed-end system, being open to atmosphere, exterior to the retorts and a part of the second sub-system. The flow of transforming feedstock masses is through the gas tight interior of the retorts as a part of the first sub-system being the closed-end system. Air has been displaced and excluded from taking part in process reactions within the closed-end system.

The systems and processes of this invention includes the sub-system and processes of the closed-end system., One system component is the pyrolytic apparatus having burners to ignite a mixture of hot ambient air from the second sub-system and the combustible gas mixture from the closed-end system. The resulting flame envelope within the pyrolytic apparatus cavity radiator is also a part of the second sub-system being outside the closed-end system. The flame indirectly transfers heat through walls of the retorts within the pyrolytic apparatus cavity radiator to a moist feedstock within the closed-end system. Feedstock is converted in the absence of air to a valued activated carbon and a net amount of combustible gas in the closed-end system. The feedstock is not burned and the activated carbon does not produce carbon oxides, nitrogen oxides, or ash products of combustion.

The independent and optional gas engine-generator uses the combustible gas product of the closed-end system to produce electrical energy and connect with the second sub-system. Optional use of the gas engine exhaust to help provide heat through an exhaust duct, and possibly using a duct burner, for the pyrolytic apparatus, the drying apparatus and/or the regenerating apparatus is also a part of the second sub-system. Many low grade waste materials can be converted to provide electrical power with less than conventional emissions of $CO_2$ or $NOx$ and without ash or other regulated emissions using the gas engine-generator part of the second sub-system.

As previously disclosed, an embodiment of this invention is the design and use of a "cavity radiator" for a plurality of retorts with a plurality of functions. That is, the functions performed by the pyrolytic apparatus, the regenerating apparatus and the drying apparatus can all be achieved by a plurality of the same apparatus units each having at least one retort or a single apparatus unit having at least two retorts. They are structurally the same, but have different operating parameters being the amount of heat in the cavity radiator outside the retorts of the closed-end system, the amount of time the different products are in this radiant environment and the degree of turbulence in the closed-end system.

The term cavity radiator refers to an insulated enclosure heated by a mass emitting predominantly infrared radiation which approach the performance of a waveguide resonator (heat source mass) and a black body (retort). Specifically, it is an enclosing apparatus operated at atmospheric pressure and at a high temperature outside the closed-end system to heat retorts which serve as a steady state reactor for the closed-end system. A plurality of retorts may be configured interconnected one above another or two above one; as preferred for the stand alone pyrolytic apparatus 4 shown in FIG. 4. Retorts may also be interconnected side by side, one connected with a second above and a third below or other interconnecting arrangements.

A plurality of functions may be employed in a pyrolytic unit such as dry and preheat (apparatus 60), convert and activate (apparatus 4) or regenerate and reactivate (apparatus 50). The closed-end system and processes of this invention will also crack gases and form carbon black, synthesize fullerenes, decompose hazardous compounds, generate gaseous feedstock to form alcohols, concentrate metal ores, separate inert fractions, desalinate, reclaim foundry sand, sublimate oils, produce tars and waxes, reform steam and otherwise transform feedstock. Radiant heat from a mass in a cavity radiator may be supplied by gas burners, oil burners, exhaust gases, radiant electrical resistors, concentrated solar arrays or other hot gasses. A plurality of pyrolytic units may be arranged in series or parallel (FIG. 2) as a modular plant system to interrelate with one another. For example, a pyrolytic unit with gas burners to pyrolyze feedstock and reactivate its activated carbon product with its gas product and combustion air can interface and heat another pyrolytic unit which preheats the combustion air, dries and preheats a second feedstock and dries and preheats its activated product after another use within the system and process.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A modular flash pyrolysis type plant system to produce an activated carbon matrix product and a clean combustible gas product from an organic feedstock comprising:

at least one feedstock receiving unit to accept, hold and convey a feedstream of at least one solid organic feedstock;

a pair of insulated pyrolytic apparatus to receive contain, convey and convert the solid feedstock at approximately atmospheric pressure and thereby producing and discharging a mixture of intermediate solid and gas products being both a solid activated carbon type product and a gaseous hydrocarbon type product, wherein said pyrolytic apparatus has at least one gas burner unit as a cavity radiator heat source to provide the heat of pyrolytic conversion;

a jacketed conveyor to accept, contain and convey the intermediate products from each one of the pyrolytic apparatus and allow the temperature of said intermediate products to be reduced by association with ambient air within a jacket around a covered and enclosed portion of the jacketed conveyor;

a spray water section unit to receive, contain, convey and convert the intermediate products from each one the jacketed conveyors, wherein a spray of water adjusts the relative amounts of steam, hydrogen, carbon dioxide and carbon monoxide in the intermediate products to provide an enhanced intermediate mixture of products being an enhanced gas mixture and a carbon slurry product when the flow rate of additional spray water is adjusted to further regulate the temperature of said feedstream;

at least one gas separator/scrubber to accept the carbon slurry and the enhanced gas mixture from the spray water sections, to divide the carbon slurry product from the enhanced gas mixture and to scrub the enhanced gas mixture such that the cooled total product stream is separated;

at least one gas mixture processing unit where the enhanced and scrubbed gas mixture is received from each gas scrubber unit to be processed for storage as a combustible gas mixture in a combustible gas storage unit as well as transported to at least one other energy producing unit of the plant including the pyrolytic apparatus for use as a combustible fuel in at least the pyrolytic apparatus cavity radiator burner units to help produce the heat for pyrolysis;

at least one air supply system including a blower and air duct piping to provide the oxygen for combustion of the combustible gas mixture in at least the pyrolytic apparatus burner units, said air duct piping for each pyrolytic apparatus burner unit being connected with an outer jacket on the jacketed conveyor to increase the temperature of the ambient air of combustion and thereby increase the thermal efficiency of the plant;

at least one dewatering assembly including a drain bin with a condenser, an inclined dewatering conveyor and a quench tank to receive and dewater the carbon slurry pumped from a lower outlet port of the gas scrubber unit, wherein a major portion of the water is removed from the carbon slurry and returned to at least the gas scrubber unit and the spray water section and a wet activated carbon product is produced; and at least one regenerating apparatus to receive, contain, convey and convert the wet activated carbon product from at least one respective dewatering assembly, said regenerating apparatus having at least one cavity radiator portion being an outer jacket portion containing hot exhaust gases from the cavity radiator of another apparatus to radiate heat to and through regenerating retorts for further drying and pyrolysis of the activated carbon product thereby producing additional gaseous products and a dry enhanced activated carbon matrix, wherein the further gaseous products are discharged from the regenerating apparatus by a gas outlet pipe to the spray water section and the enhanced activated carbon matrix is discharged through a rotary valve at a carbon outlet port by an internal conveyor system including an auger, each said cavity radiator further having at least one exhaust port to discharge the hot exhaust gasses, whereas the enhanced activated carbon matrix and the combustible gas mixture is available for public use.

2. The system set forth in claim 1, wherein there exists a drying apparatus in addition to the other apparatus to receive at least a portion of the solid feedstock and thereafter to remove a predetermined amount of water from said feedstock portion by heating, vaporizing, condensing and exhausting said amount of water as steam/water from said drying apparatus, said drying apparatus having a cavity radiator, drying retorts and a drying apparatus burner unit using the combustible gas mixture from the gaseous processing unit, said drying apparatus further having an second inlet port to accept the exhaust from another cavity radiator and a second discharge port through which the partially dried and preheated feedstock portion is conveyed to the feedstream before going to the pyrolytic apparatus.

3. The system set forth in claim 1, wherein there exists a drying apparatus in addition to the other apparatus to receive at least a portion of the wet activated carbon product from the dewatering assembly and thereafter to removes a predetermined amount of water from said portion of the carbon product by heating, vaporizing, condensing and exhausting said amount of steam/water from said drying apparatus, said drying apparatus having a cavity radiator, drying retorts and a drying apparatus burner unit using the combustible gas mixture from the gaseous processing unit, said drying retorts further having a first inlet port to accept the exhaust from another cavity radiator and a first discharge port through which the partially dried and preheated moist activated carbon product is conveyed to the retorts for regenerating.

4. The system set forth in claim 3, wherein the drying apparatus receives a predetermined portion of the feedstock in addition to the wet activated carbon product and removes a second predetermined amount of water from said feedstock portion by further heating, vaporizing, condensing and exhausting said second amount of steam/water from said drying retorts, said drying retorts having a second discharge port through which the partially dried an preheated feedstock portion is conveyed to the feedstream before going to the pyrolytic apparatus.

5. The system set forth in claim 1, wherein the modular plant system further comprises:

at least one gas engine for each pyrolytic apparatus that operates using the combustible gas mixture from the gaseous processing unit and/or from the gas storage unit, wherein there are at least two gas engines per plant system; and an electrical generator being operated by each respective gas engine to provide an electrical power supply connection.

6. The system set forth in claim 5, wherein the gas engines have an exhaust system including an exhaust duct with a duct burner to thermally condition the exhaust gases from the gas engine and supply hot exhaust gasses to at least one of the cavity radiators of the system to increase the overall thermal efficiency of the plant system.

7. The system set forth in claim 1, wherein there further exists at least one material processing unit to receive at least a portion of the feedstock from a respective receiving unit, provide a predetermined moisture content, size and mixture of the solid feedstock portion and convey, weigh and meter the processed feedstock portion to a respective system apparatus.

8. The system set forth in claim 7, wherein the plant further comprises a material processing unit having;

a shredder unit to provide at least one solid feedstock of a predetermined size based on the calorific content and the moisture content and the like of said solid feedstock;

a water spray device to provide additional moisture to a predetermined portion of the feedstock;

a mixer unit to weigh, meter, blend and convey different portions of more than one feedstock together to form the total feedstream; and a conveyor/elevator to transport and load the feedstream into a retort inlet hopper at the inlet port of the pyrolytic apparatus.

9. The system set forth in claim 1, wherein at least one system apparatus comprises:

a retort inlet hopper at an inlet port to receive the feedstream of feedstock from the receiving unit and/or a processing unit;

at least one first retort that receives the feedstream from the inlet port and utilize the feedstream to block the flow of air into the retorts;

means for conveying the feedstream in the first retorts as well as transferring and conveying the feedstream to create a turbulent flow of the feedstock in the process of being converted within the retorts for a predetermined time at approximately atmospheric pressure;

means for heating the retorts to a predetermined high temperature within a cavity radiator by any one of a combination including a burner unit, exhaust from a gas engine, exhaust from a duct heater, solar energy and the like to provide the heat for thermal conversion of the feedstock within the retorts;

means for insulating and shaping the cavity radiator to maintain the radiant heat and energy transfer to all portions of the retorts and to facilitate the operation and maintenance of the apparatus;

a product output port to form a passageway for the feedstream products to pass from the retorts to the jacketed conveyor; and means for interconnecting the retorts and the cavity radiators to assist one or the other in its part of the conversion process.

10. The system set forth in claim 9. wherein the plant system further comprises two sub-systems being:

a first sub-system being relatively fixed in its structure and comprising a closed-end system containing the components of at least pyrolytic conversion of feedstock to usable products; and a second sub-system being relatively flexible in its structure and comprising those components associated with the cavity radiators and the use of the products within the plant system as a source of heat and energy or for public consumption.

11. The system set forth in claim 9, wherein the cavity radiator is octagonal in shape and has an upper assembly and a lower assembly which interface with each other at assembly flanges having means for connecting the upper and lower assemblies, said cavity radiator further having two removable end plates, one at each end of the apparatus, wherein the retorts as well as the burner units and at least one exhaust outlet port are supported by the end plates of the cavity radiator, said apparatus being supported in total by a base support.

12. An system for converting a moist organic feedstock material into a combustible gas mixture and an activated carbon product comprising:

a pyrolytic apparatus that converts the feedstock by flash pyrolysis into an intermediate solid and gas mixture using a cavity radiator having a first burner to provide a radiant heat and energy environment with a temperature in the range of about 700 degrees Fahrenheit to about 2400 degrees Fahrenheit, said pyrolytic apparatus having a exhaust gas in a somewhat lower range of temperatures;

a spray water section that receives the intermediate mixture from the pyrolytic apparatus and has a spray water system that adjusts the relative amounts of hydrogen, steam, carbon dioxide and carbon monoxide in the intermediate mixture to provide an enhanced intermediate mixture and cools the enhanced intermediate mixture to below 212 degrees Fahrenheit, said water coming from the moisture in the feedstock;

a gas separator/scrubber that separates and scrubs the enhanced intermediate mixture from the spray water section to provide a combustible gas mixture and a carbon slurry, a portion of said combustible gas mixture being used for said first burner and optionally a second burner;

a dewatering assembly that removes a major portion of the water from the carbon slurry coming from the gas separator forming a wet carbon product and filtered water and thereby provides the water for the spray water section and the gas separator;

an optional regenerating apparatus that uses the hot exhaust gas from the pyrolytic apparatus to further dry and pyrolytically convert the wet carbon product from the dewatering assembly into a dry and usable activated carbon, said optional regenerating apparatus further discharging steam and gases to the spray water section, said regenerating apparatus being optionally required to meet a predetermined condition of the wet carbon; and an optional drying apparatus having a cavity radiator to provide heat and energy to additionally remove moisture from at least a portion of the wet activated carbon product from the dewatering assembly provided the moisture content of the moist activated carbon product is more than about 30 percent by mass, said optional drying apparatus to return a moist activated carbon product to the optional regenerating apparatus, if available, for further drying and conversion into a dry, enhanced and activated carbon product, said drying being required if the optional regenerating apparatus does not exist in the system, wherein the cavity radiator for drying uses the hot exhaust gas from the cavity radiator for pyrolyzing and wherein steam and gases from drying the wet activated carbon are condensed in the drain bin of the dewatering assembly, wherein a usable activated carbon product is discharged for public consumption.

* * * * *